(12) United States Patent
Lepage et al.

(10) Patent No.: US 6,886,763 B2
(45) Date of Patent: May 3, 2005

(54) BALE PROCESSOR

(75) Inventors: Charles Lepage, Saskatoon (CA); Murray Kosokowsky, Pilger (CA); Kimball Lischynski, Saskatoon (CA)

(73) Assignee: Highline Mfg. Inc., Saskatchewan (CA)

( * ) Notice: Subject to any disclaimer, the term of this patent is extended or adjusted under 35 U.S.C. 154(b) by 73 days.

(21) Appl. No.: 10/175,323

(22) Filed: Jun. 19, 2002

(65) Prior Publication Data

US 2002/0195509 A1 Dec. 26, 2002

Related U.S. Application Data

(63) Continuation-in-part of application No. 10/090,213, filed on Mar. 4, 2002, now Pat. No. 6,708,911.
(60) Provisional application No. 60/299,554, filed on Jun. 20, 2001, provisional application No. 60/299,463, filed on Jun. 20, 2001, provisional application No. 60/299,560, filed on Jun. 20, 2001, and provisional application No. 60/333,210, filed on Nov. 6, 2001.

(51) Int. Cl.$^7$ .............................................. B02C 17/00
(52) U.S. Cl. ....................... 241/88.4; 241/194; 241/605
(58) Field of Search ....................... 241/186.4, 101.761, 241/605, 88.4, 194, 101.76

(56) References Cited

U.S. PATENT DOCUMENTS

| | | | |
|---|---|---|---|
| 2,952,466 | A | 9/1960 | Carlson et al. |
| 3,436,028 | A | 4/1969 | Koehnen et al. |
| 3,966,128 | A | 6/1976 | Anderson et al. |
| 3,979,077 | A | 9/1976 | Dalman |
| 3,999,674 | A | 12/1976 | Meitl |
| 4,083,501 | A | 4/1978 | Ryan |
| 4,094,427 | A | 6/1978 | White et al. |
| 4,094,428 | A | 6/1978 | White et al. |
| 4,101,081 | A | 7/1978 | Ritter et al. |
| 4,134,554 | A | 1/1979 | Morlock |

(Continued)

FOREIGN PATENT DOCUMENTS

| | | |
|---|---|---|
| CA | 2142116 | 2/1994 |
| CA | 2171146 | 9/1997 |
| CA | 2179121 | 12/1997 |

(Continued)

OTHER PUBLICATIONS

Highline Mfg. Inc., "Bale Pro 6800—Assembly Operator Parts Manual", Aug. 1997.

Primary Examiner—Mark Rosenbaum
(74) Attorney, Agent, or Firm—Adrian D. Battison; Michael R. Williams; Ryan W. Dupuis

(57) ABSTRACT

Disclosed is an apparatus for disintegrating bales of agricultural material such as hay. The apparatus has a chassis with a bale receptacle mounted thereon. A disintegrator is mounted in the bale receptacle and is adapted to disintegrate baled crop material in the bale receptacle and discharge the processed baled material out of the bale receptacle. A manipulator is mounted in the processing tub above the disintegrator adapted to manipulate the baled crop material in the bale receptacle to expose different parts thereof to the disintegrator and a passive support means is provided in the bale receptacle above the disintegrator. The manipulator and passive support means are positioned on opposing sides of the disintegrator to facilitate maintenance of the baled crop material above the disintegrator such that the disintegrator engages the baled crop material between the manipulator and the passive support means. In an embodiment of the invention, the bale receptacle comprises a tub with a discharge opening provided in one of the side walls thereof which is detachably mounted to the chassis such that the discharge opening can be positioned on either the left or right hand side of the chassis. In another embodiment, the invention also provides a flail roller design that reduces the adverse consequences of back slap of the flails and a manner of mounting the flail roller that reduces the stresses on the bearings.

14 Claims, 18 Drawing Sheets

U.S. PATENT DOCUMENTS

| | | | |
|---|---|---|---|
| 4,151,961 A | | 5/1979 | Makofka et al. |
| 4,195,958 A | * | 4/1980 | Vahlkamp et al. ......... 414/24.6 |
| 4,218,022 A | | 8/1980 | Boehm et al. |
| 4,227,654 A | | 10/1980 | Seefeld et al. |
| 4,266,899 A | * | 5/1981 | Skeem ...................... 414/24.6 |
| 4,448,361 A | | 5/1984 | Marcy |
| 4,449,672 A | | 5/1984 | Morlock et al. |
| 4,524,916 A | | 6/1985 | Keyes et al. |
| 4,597,703 A | | 7/1986 | Bartolini |
| 4,621,776 A | | 11/1986 | Hostetler |
| 4,657,191 A | | 4/1987 | Dwyer et al. |
| 4,779,810 A | | 10/1988 | Frey |
| 4,830,292 A | | 5/1989 | Frey |
| 4,951,883 A | | 8/1990 | Loppeti et al. |
| 5,033,683 A | | 7/1991 | Taylor |
| 5,071,079 A | | 12/1991 | Fykse et al. |
| 5,090,630 A | | 2/1992 | Kopecky et al. |
| 5,169,078 A | | 12/1992 | Lamar |
| 5,207,391 A | | 5/1993 | Anderson |
| 5,255,867 A | | 10/1993 | Whittleton et al. |
| 5,340,040 A | | 8/1994 | Bussiere et al. |
| 5,368,238 A | | 11/1994 | Bergkamp et al. |
| 5,601,241 A | | 2/1997 | Brewster |
| 5,622,323 A | | 4/1997 | Krueger et al. |
| 5,653,394 A | | 8/1997 | Bussiere et al. |
| 5,738,287 A | | 4/1998 | Vanderberg |
| 5,950,935 A | | 9/1999 | Seymour |
| 5,967,427 A | | 10/1999 | Seymour |
| 6,109,553 A | | 8/2000 | Hruska |

FOREIGN PATENT DOCUMENTS

| | | | |
|---|---|---|---|
| CA | 2191692 | | 1/1998 |
| CA | 2202014 | | 10/1998 |
| CA | 2236953 | | 11/1998 |
| CA | 2246465 | | 1/2000 |
| EP | 373789 | | 6/1990 |
| FR | 2560739 | * | 9/1985 |
| GB | 2100106 | | 12/1982 |
| GB | 2101882 | | 1/1983 |
| GB | 2255956 | | 11/1992 |

* cited by examiner

BALE PROCESSOR

CROSS-REFERENCE AND RELATED APPLICATIONS

This application Claims the benefit of U.S. Provisional Application Ser. Nos. 60/299,554 filed Jun. 20, 2001; 60/299,463 filed Jun. 20, 2001; 60/299,560 filed Jun. 20, 2001; and 60/333,210 filed Nov. 6, 2001 each of which are incorporated herein by reference in its entirety. This application is also a continuation-in-part of U.S. application Ser. No. 10/090,213 filed Mar. 4, 2002 (now U.S. Pat. No. 6,708,911) which Claims the benefit of U.S. Provisional Application Ser. Nos. 60/299,554 filed Jun. 20, 2001; 60/299,463 filed Jun. 20, 2001; 60/299,560 filed Jun. 20, 2001; and 60/333,210 filed Nov. 6, 2001, which is incorporated herein by reference in its entirety.

FIELD OF INVENTION

The invention relates to an improved apparatus for disintegrating bales of agricultural material such as hay.

BACKGROUND

Bale processors, including processors of the type having a tub with a longitudinally disposed disintegration flail roller and two bale support rollers (as disclosed in Canadian Patent No. 2,086,569 owned by the applicant herein) are known. Additionally, processors that include a driven feeder chain or conveyor belt to rotate the bale such that different portions of the baled material are exposed to the disintegration flail roller are also known.

The majority of the bale processors known to the inventors are only adapted to process one type of bale configuration commonly used in the industry (i.e. "round" or "square"). Furthermore, primarily due to the large size and weight of modern "square" bales (which have a rectangular configuration), problems may be encountered with operational flexibility and durability of some processors. Moreover, the majority of the processors known to the inventors are only adapted to discharge out of one side of the processor.

Moreover, the majority of flail rollers known to the inventors are designed with a series of flails pivotally mounted in straight rows along the length of the flail roller. When the flails engage the baled material with significant force, the flails are forced backwards and come into contact with the flail drum. This action is commonly referred to as "back slap". When back slap occurs, the center of gravity of the flail drum is altered which results in the flail drum becoming out of balance and vibrations in the system. Furthermore, the tip speed of the flail is also reduced which results in reduced processing speed and throw distance.

In addition, the majority of bale processors known to the inventors are mounted to the end walls of the bale processors by a set of bearings. However, during operation, the flail roller and the end walls of the bale processor vibrate. These vibrations induce stresses on the housings of the bearings which mount the flail drum.

SUMMARY OF INVENTION

It is an object of the present invention to provide a bale processor having operational flexibility and enhanced durability. According to a broad aspect of the invention, the invention provides an apparatus for processing baled crop material comprising: a chassis having a front and rear end and a left and right side; a bale receptacle mounted on the chassis; a disintegrator mounted in the bale receptacle adapted to disintegrate baled crop material in the bale receptacle and discharge the processed baled material out of the bale receptacle; a manipulator mounted in the bale receptacle above the disintegrator adapted to manipulate the baled crop material in the bale receptacle to expose different parts thereof to the disintegrator; and passive support means in the bale receptacle above the disintegrator; wherein the manipulator and passive support means are positioned on opposing sides of the disintegrator to facilitate maintenance of the baled crop material above the disintegrator such that the disintegrator engages the baled crop material between the manipulator and the passive support means.

According to another aspect of the invention, the invention provides an apparatus for processing baled crop material comprising: a chassis having a front and rear end and a left and right side; a processing tub mounted on the chassis having two opposing end walls, two opposing side walls and a discharge opening in one of the side walls; a flail roller mounted in the processing tub having a plurality of flails mounted thereon and adapted to be rotated about its longitudinal axis to disintegrate baled crop material in the processing tub and discharge the processed baled material out the discharge opening; a plurality of axially spaced rods mounted within the processing tub at a height above the flail roller wherein the flails extend through the spaces between the rods to engage the baled crop material above the rods; a driven feed roller mounted in the processing tub above the flail roller, extending longitudinally therein and adapted to rotate about its longitudinal axis by a power source wherein the driven feed roller has manipulating members extending radially therefrom to engage and rotate the baled crop material to expose different parts thereof to the flail roller; and a passive support means positioned above the flail roller comprising at least one roller adapted to rotate about its longitudinal axis and mounted adjacent to a wall portion of a side wall of the processing tub extending inwardly and downwardly towards the flail roller; wherein the driven feed roller and passive support means are positioned on opposing sides of the flail roller to facilitate maintenance of the baled crop material above the flail roller such that the flails engage the baled crop material between the manipulator and the passive support means.

According to yet another aspect of the invention, the invention provides an apparatus for processing baled crop material comprising: a chassis having a front and rear end and a left and right side; a bale receptacle mounted on the chassis having two opposing end walls; a flail roller positioned in the bale receptacle adapted to disintegrate baled crop material in the bale receptacle and discharge the processed baled material out of the bale receptacle, the flail roller having axial rods extending from opposing ends thereof; and a set of flail roller mounts connected to the chassis adjacent to the end walls of the bale receptacle adapted to receive the axial rods of the flail roller.

According to yet another aspect of the invention, the invention provides a flail roller for an apparatus for processing baled crop material comprising a roller with a plurality of flails having a length pivotally mounted thereto such that the ratio of the length of the flails to the distance between pivotal mounts on opposing sides of the roller is less than 0.5 and the distance between the pivotal mounts on opposing sides of the flail roller is greater than 15⅜ inches.

The invention provides an improved bale processor capable of processing bales of different configurations and sizes including round and square bales. The processor is also convertible to provide for either left side discharge or right side discharge. The bale processor can process one or more round bales or alternatively a large square bale and includes an adjustable bale loading mechanism to facilitate loading bales of different size and configurations. The processor according to one embodiment of the invention also includes an adjustable axle to improve stability during operation and to facilitate transport of the apparatus.

The processor according to an embodiment of the invention also provides a flail roller design that reduces the adverse consequences of back slap of the flails and a manner of mounting the flail roller that reduces the stresses on the bearings.

BRIEF DESCRIPTION OF THE DRAWINGS

Preferred embodiments of the invention will now be described by way of example with reference to the attached drawings in which.

DETAILED DESCRIPTION OF PREFERRED EMBODIMENTS

Figure 1:
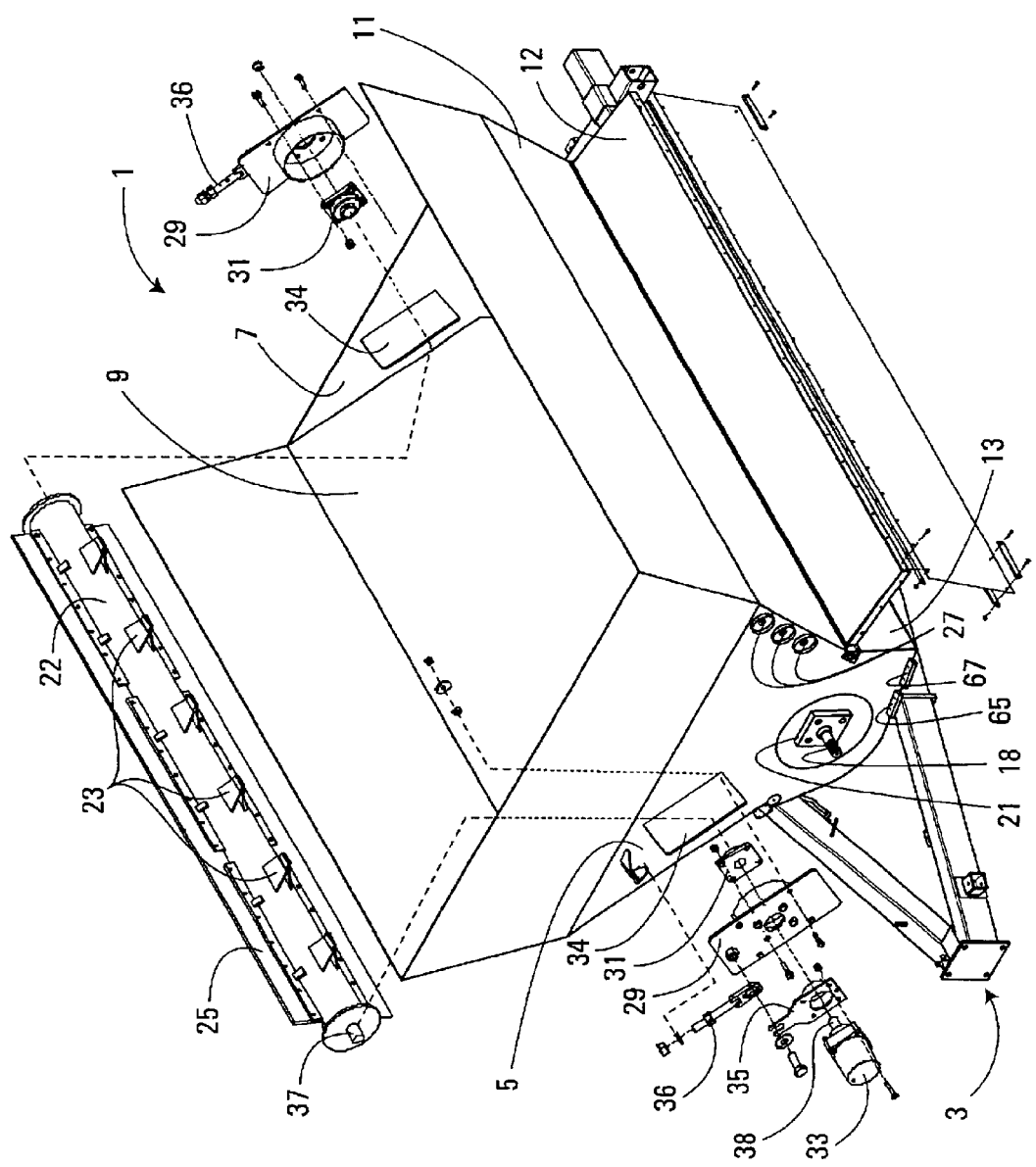
FIG. 1 is a left side perspective view of a bale processor according to an embodiment of the invention.

As shown in FIG. 1, the bale processor has a receptacle comprising a processing tub 1 mounted on a chassis 3. The tub 1 has symmetrical end walls 5 and 7 and side walls 9 and 11 of differing configurations. A discharge opening 13 is provided at the bottom of side wall 11. A discharge door 12 is pivotally attached to side wall 11 above the discharge opening 13. The discharge door 12 is raised and lowered to direct the processed baled material as it is ejected from the discharge opening 13. The discharge door 12 can be adjusted manually or actuated through a hydraulic or electric system of any suitable type known in the art.

In the embodiment shown in FIG. 1, side wall 11 is located on the left side of the bale processor. As discussed below, the processing tub 1 and the chassis 3 are designed such that the processing tub can be rotated 180 degrees to position side wall 11 on the right side of the processor (see FIG. 10).

Figure 3:
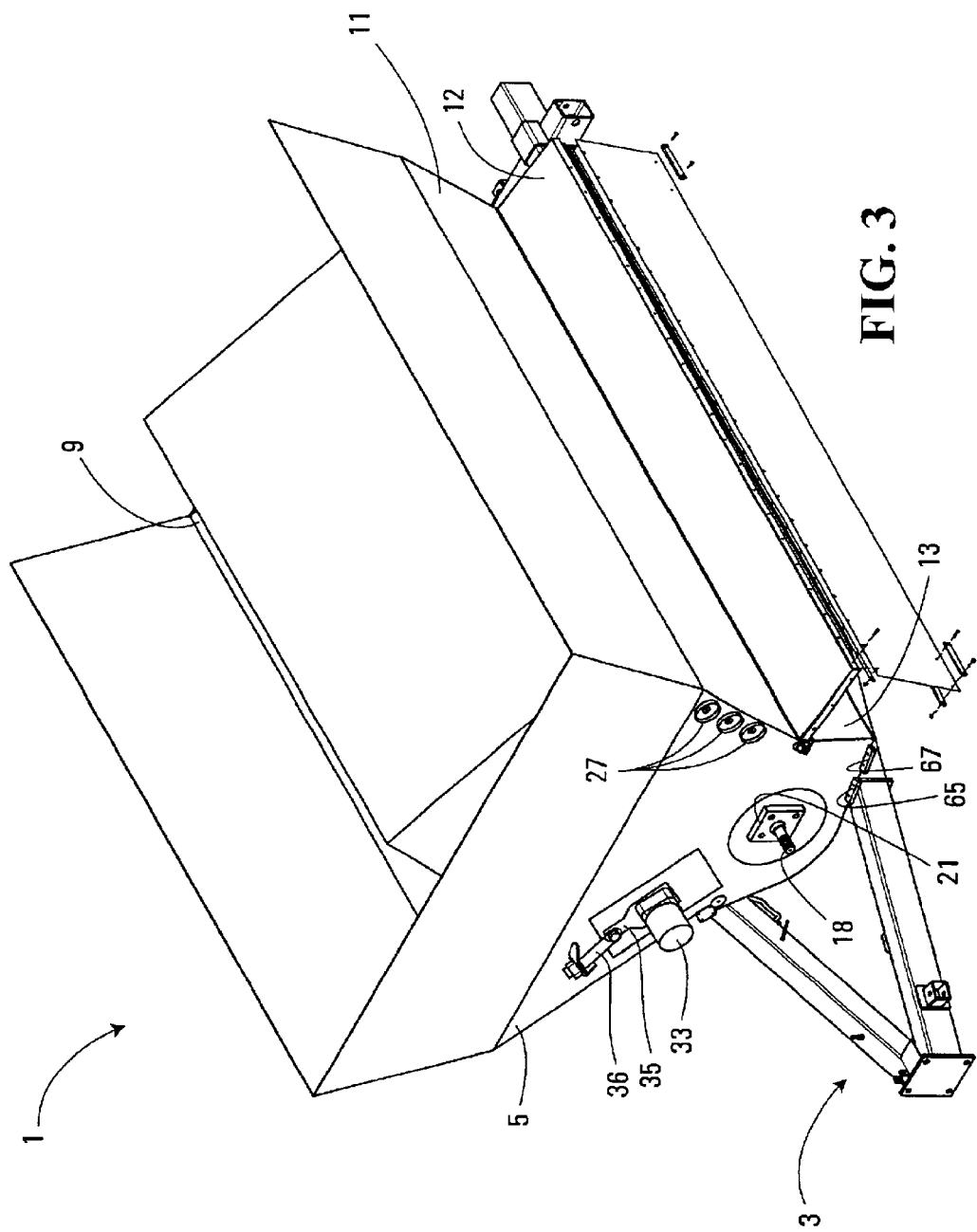
FIG. 3 is a left side perspective view of a bale processor according to an embodiment of the invention with a large square bale positioned lengthwise therein.
Figure 7:
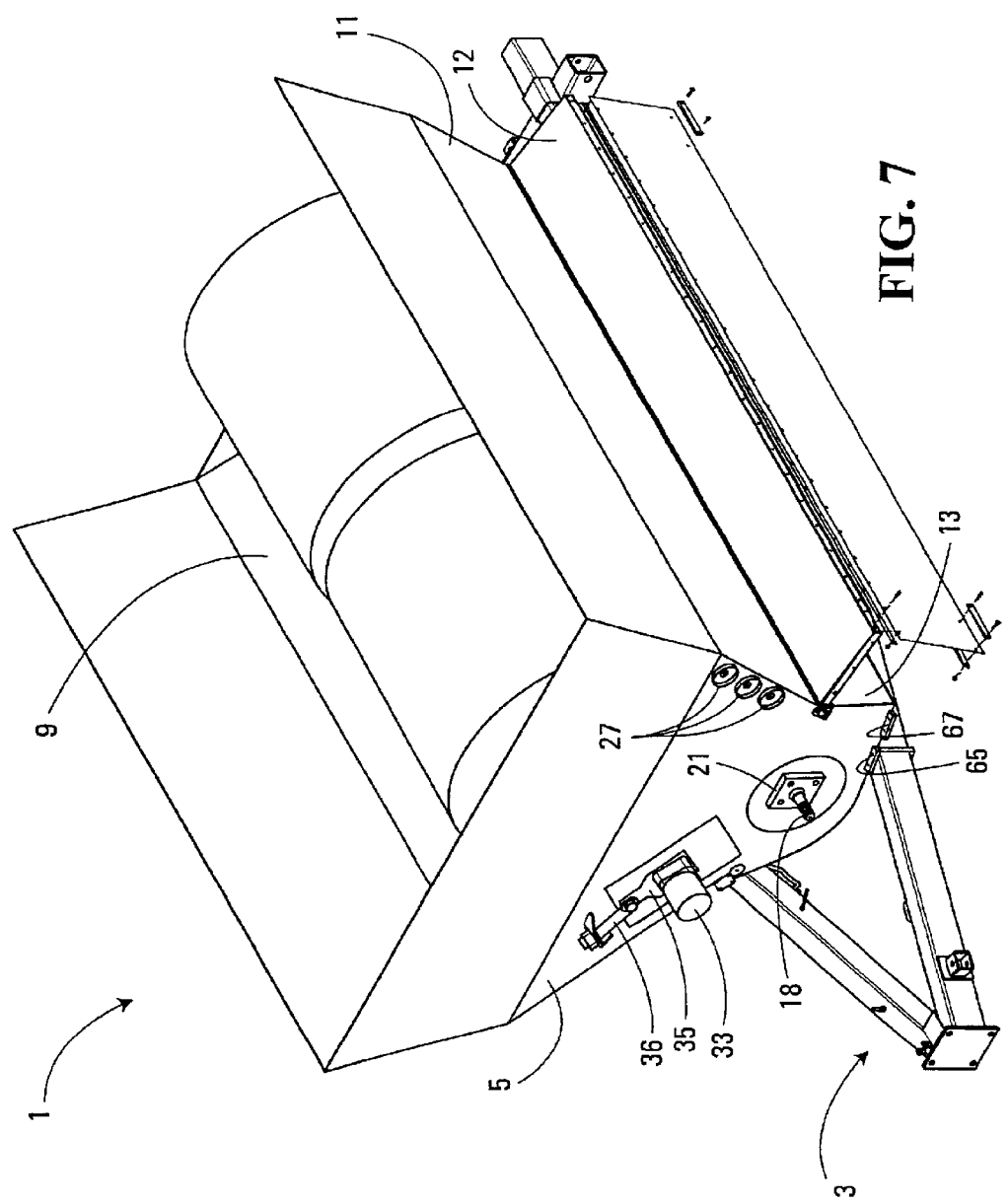
FIG. 7 is a left side perspective view of a bale processor according to an embodiment of the invention with two round bales positioned therein.

As shown in FIGS. 3 and 7, the processing tub 1 is sized such that a large square bale, or, alternatively, two round bales, may be positioned lengthwise therein for processing. Typically, an inside width of approximately 7.5 feet (side wall 9 to side wall 11) and in inside length of at least 10 feet (from end wall 5 to end wall 7) is sufficient to accommodate most large bales in this manner.

Figure 2:
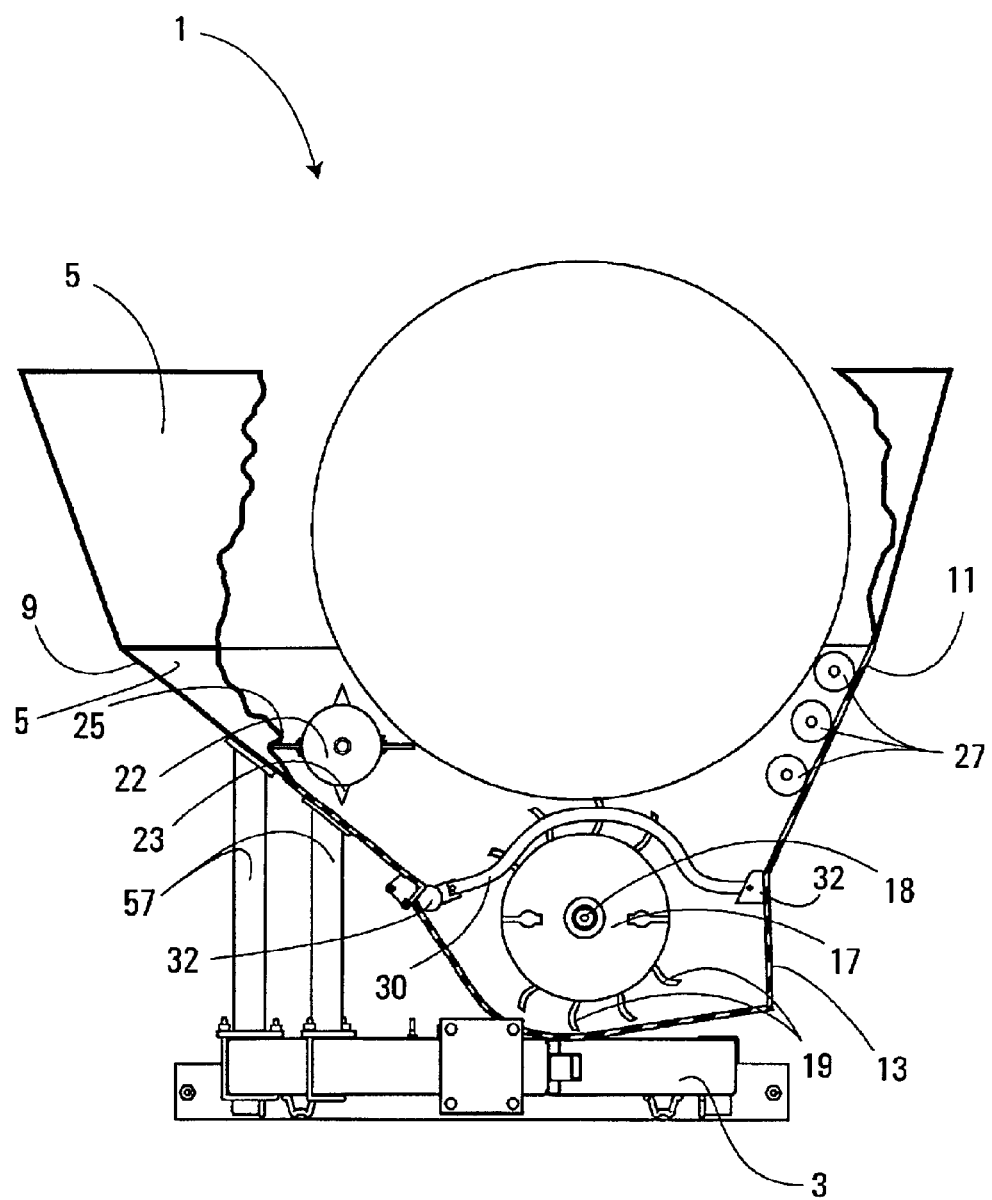
FIG. 2 is a cut away front view of a bale processor according to an embodiment of the invention.

As shown in FIG. 2, a disintegrator is mounted within the processing tub 1. In the embodiment illustrated, the disintegrator comprises a flail roller 17 extending the length of the processing tub 1 and mounted in the bottom thereof. The flail roller 17 is rotatable about its longitudinal axis such that a series of flails 19 pivotally mounted thereon extend to engage and separate the baled material contained within the processing tub 1. In the embodiment shown, the flail roller 17 is slightly offset from the center of the processing tub 1. The offset of the flail roller 17 provides balance to the apparatus due to the differing configurations of side walls 9 and 11 as well as the location of a driven feed roller 22 which is discussed in greater detail below.

Figures 14, 15:
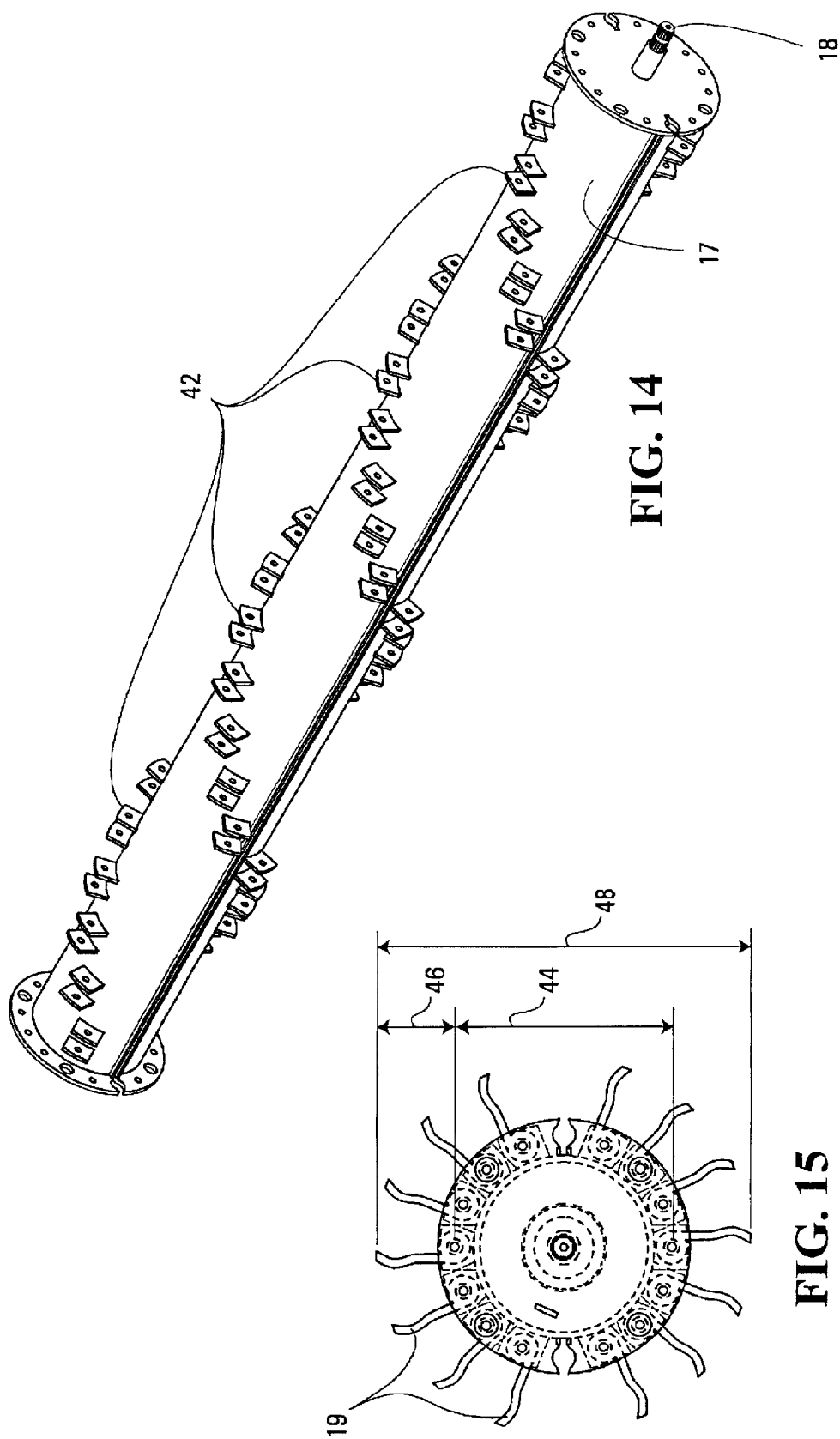
FIG. 14 is a perspective view of a flail roller according to an embodiment of the invention without the flails mounted thereon.
FIG. 15 is an end view of a flail roller according to an embodiment of the invention.

FIGS. 14 and 15 illustrate a design of flail roller 17 according to an embodiment of the invention. As shown in FIG. 14, the flail roller is provided with a plurality of flail mounts 42. The flail mounts 42 are spaced longitudinally along the periphery of the flail roller 17 in two opposing spiral configurations. The flails 19 are pivotally mounted to the flail mounts 42. As shown in FIG. 15, the flail roller has a pivot diameter 44, being the distance between opposing flail mounts 42, and each flail has a flail length 46. During operation, the flail roller has a sweep distance 48 measured between the tips of the two opposing flails 19. For improved performance in processing speed, throw distance and durability of the flail roller 17, the flail roller is provided with a pivot diameter equal to or greater than 15⅜ inches and a flail length to pivot diameter ratio of less than 0.5. However, the length of the flails must be of sufficient length to extend to engage the baled material positioned in the processing tub 1. The reduction of the flail length to pivot diameter reduces the change in the center of gravity of the flail roller 17 which results from the back slap of the flails 19. The spiral configuration of the flails 19 on the flail roller 17 also reduces the number of flails in contact with the baled material at one time. Thus, the change in the center of gravity resulting from back slap of the flails 19 is further reduced. In addition, the reduction in the flail length to pivot diameter ratio results in the change in sweep diameter resulting from back slap of the flails 19 being reduced thereby reducing the effect of back slap on the tip speed of flails 19.

The flail roller 17 is rotated by a power source (not shown). As shown in FIG. 1, the flail roller 17 may be adapted to be detachably connected to a PTO drive of a tractor. To that end, a flail roller axial rod 18 is provided on the end of the flail roller 17 and extends through a set of bearings 21 mounted on end wall 5. As will be discussed in greater detail below, the opposing end of the flail roller is mounted to end wall 7 in a similar manner.

In the arrangement shown in FIGS. 1 and 2, during operation, the flail roller 17 is rotated in a clockwise direction (viewed from the rear of the machine). Accordingly, the flail roller 17 can be connected directly to the PTO of most tractors. The flail roller axial rod 18 is splined at the end thereof for insertion into a female splined connection of a standard PTO of a tractor. Alternative power sources, such as a reversible hydraulic motor, may be used to drive the flail roller 17 without departing from the invention in its broadest aspect.

As shown in FIGS. 1 and 2, the processing tub 1 is provided with a manipulator comprising a single driven feed roller 22. In the embodiment shown, the driven feed roller 22 is located above and to the left of the flail roller 17 (when viewed from the front of the processor) and extends the length of the processing tub 1. The driven feed roller 22 is rotatable about its longitudinal axis and has manipulating members comprising teeth 23 and flanges 25 extending radially therefrom. The side wall 9 extends inwardly and downwardly under the driven feed roller 22 towards the flail roller 17 to direct baled material passing between the driven feed roller 22 and the side wall 9 into the flail roller 17 for disintegration.

As shown in FIG. 1, the driven feed roller 22 is rotated about its longitudinal axis by a reversible hydraulic motor 33. The driven feed roller 22 is mounted to end wall 5 by a roller mount 29 secured on the end wall by an adjustable hanger 36. A set of bearings 31 is positioned within the roller mount 29 to support the driven feed roller 22 while permitting rotation thereof. The specifications for the bearings 31 are selected depending upon the typical load conditions of the driven feed roller 22 during operation. The adjustable hanger 36 is manually adjusted to move the roller mount within a rectangular shaped hole 34 in end wall 5 to move the driven feed roller 22 towards or away from the flail roller 17 while maintaining the driven feed roller parallel to the side wall 9. It will be understood by those skilled in the art that the adjustable hanger could be replaced by a hydraulic or electric system to move the driven feed roller 22. As shown in FIG. 1, the opposing end of the driven feed roller is mounted to end wall 7 in an identical manner as described above.

The hydraulic motor 33 is mounted to a motor mount 35 secured at the upper end thereof to the adjustable hanger 36 and the roller mount 29. The hydraulic motor 33 is detachably connected to the end of driven feed roller 22. Specifically, the driven feed roller 22 has a feed roller axial rod 37 extending from each end thereof. Each feed roller axial rod 37 has a splined female connection adapted to releasably receive a splined rotatable shaft 38 of the hydraulic motor 33. The motor mount 35 prevents rotation of the body of hydraulic motor 33 during operation and maintains the rotatable shaft 38 engaged with the feed roller axial rod 37. Alternative connection assemblies for detachably connecting the hydraulic motor to the driven feed roller would be known to those skilled in the art.

Figure 19:
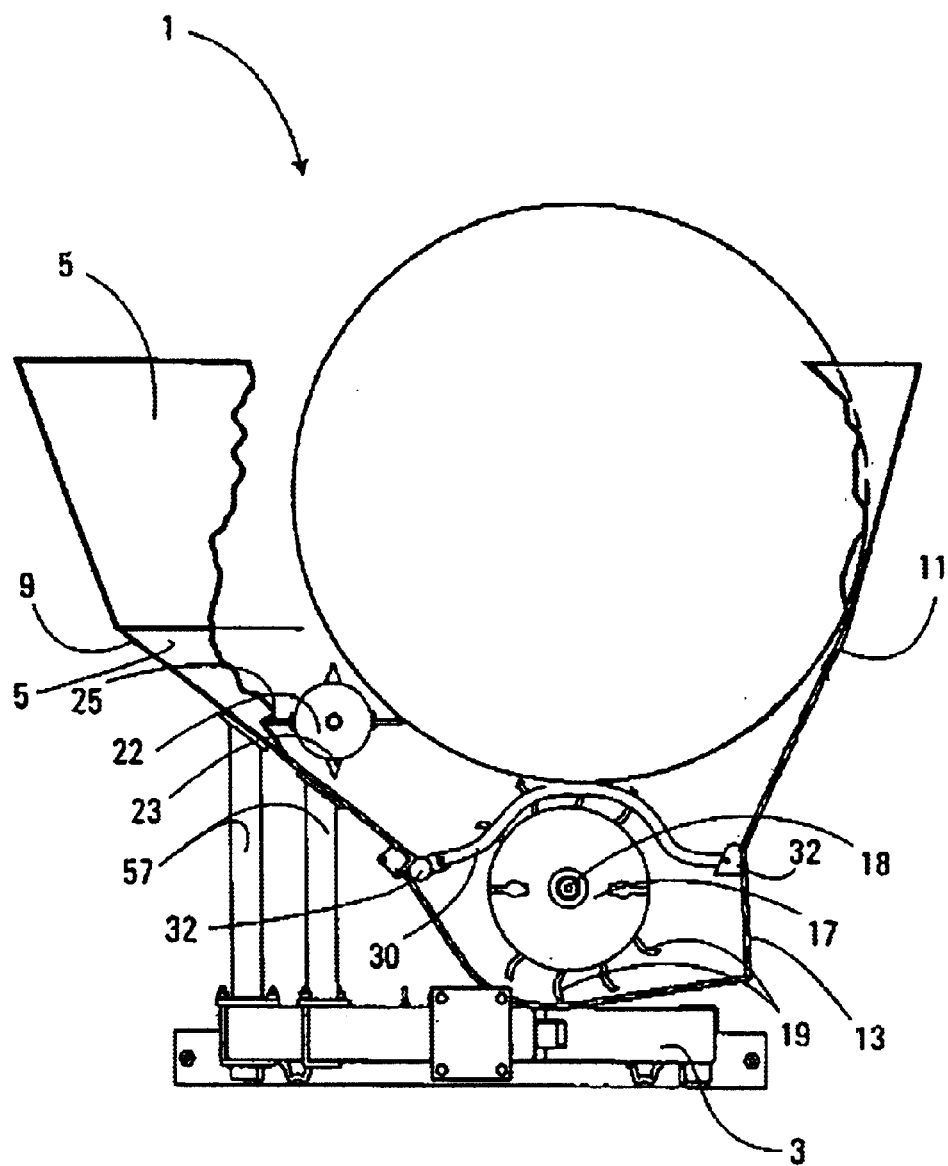
FIG. 19 is a view identical to that of FIG. 2 with the non-driven rollers omitted.

As shown in FIGS. 1 and 2, side wall 11 has a wall portion slanted inwardly and downwardly towards the flail roller 17 and is spaced from the driven flail roller 22 such that it provides a passive support means for the baled material deposited within the processing tub 1. In the embodiment shown in the drawings, the passive support means includes a set of three rollers 27 to facilitate rotation of the baled material contained within the processing tub 1. It will be understood by a person skilled in the art that the set of three rollers 27 could be replaced with a combination of one or more rollers without departing from the invention in its broadest aspect. Alternatively, the set of rollers 27 can be removed as shown in FIG. 19 and the portion of the inner surface of the portion of side wall 11 sloping inwardly and downwardly towards the flail roller would itself provide the passive support means for the baled crop material. In a further alternative, a combination of one or more rollers and/or a portion of the inner surface of side wall 11 could provide the passive support means. In a further alternative, a baffle or one or more non-driven rollers can be provided within the processing tub 1 to provide a passive support means.

During operation, as the flail roller 17 is rotated, flails 19 extends radially to engage the baled crop material positioned between the driven feed roller 22 and the set of rollers 27, separating it from the baled material and discharging the disintegrated material through the discharge opening 13. As the driven feed roller 22 is rotated, the teeth 23 and flanges 25 engage the baled material contained within the processing tub 1 to rotate the baled material thereby exposing different sections thereof to the flails 19 for disintegration. The set of rollers 27 supports the baled crop material and facilitate rotation thereof. The hydraulic motor 33 is reversible such that the driven feed roller 22 can rotate the baled material in both directions.

As shown in FIG. 2, a set of feed control rods 30 are provided within the processing tub 1 above the flail roller 17. The feed control rods 30 are mounted to the side walls 9 and 11 of the processing tub 1 and are axially spaced along the length of the processing tub 1 such that, in operation the flails 19 extend therebetween to engaged the baled material within the processing tub. The height of the feed control rods 30 above the flail roller 17 can be adjusted to alter the rate at which the baled material is disintegrated and discharged from the processing tub 1. The height is adjusted by movement of the location of mounts 32 connecting the feed control rods 30 to the side walls 9 and 11. In one embodiment, a series of mounting locations is provided on each of the side walls 9 and 11 which can be used to mount the feed control rods 30 by use of a locking pin or other arrangement. Alternatively, the height of the feed control rods 30 can be actuated by movement of mounts 32 through a hydraulic or electric system of any suitable type known in the art.

Figure 4:
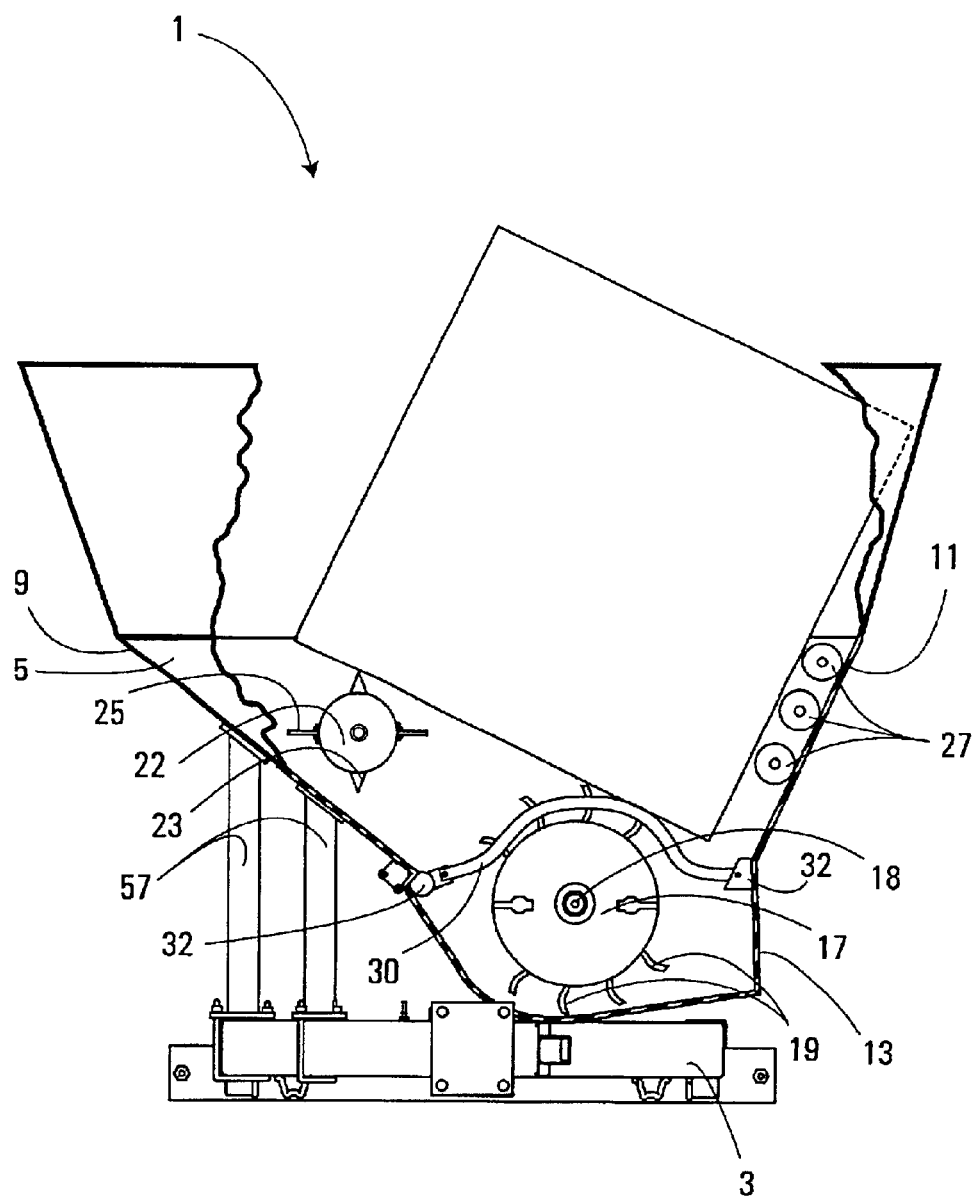
FIG. 4 is a cut away front view of a bale processor according to an embodiment of the invention with a large square bale positioned lengthwise therein.

The feed control rods 30 minimize clogging and damage of the flail roller 17 for undisintegrated baled material passing between the driven feed roller 22 and the passive support means. The feed control rods support any such material as it is disintegrated by the flails 19. In addition, as is shown in FIGS. 4 and 6, the feed control rods also provide support when bales of different configurations, such as square bales, are deposited within the tub processing tub 1 for disintegration.

Figure 5:
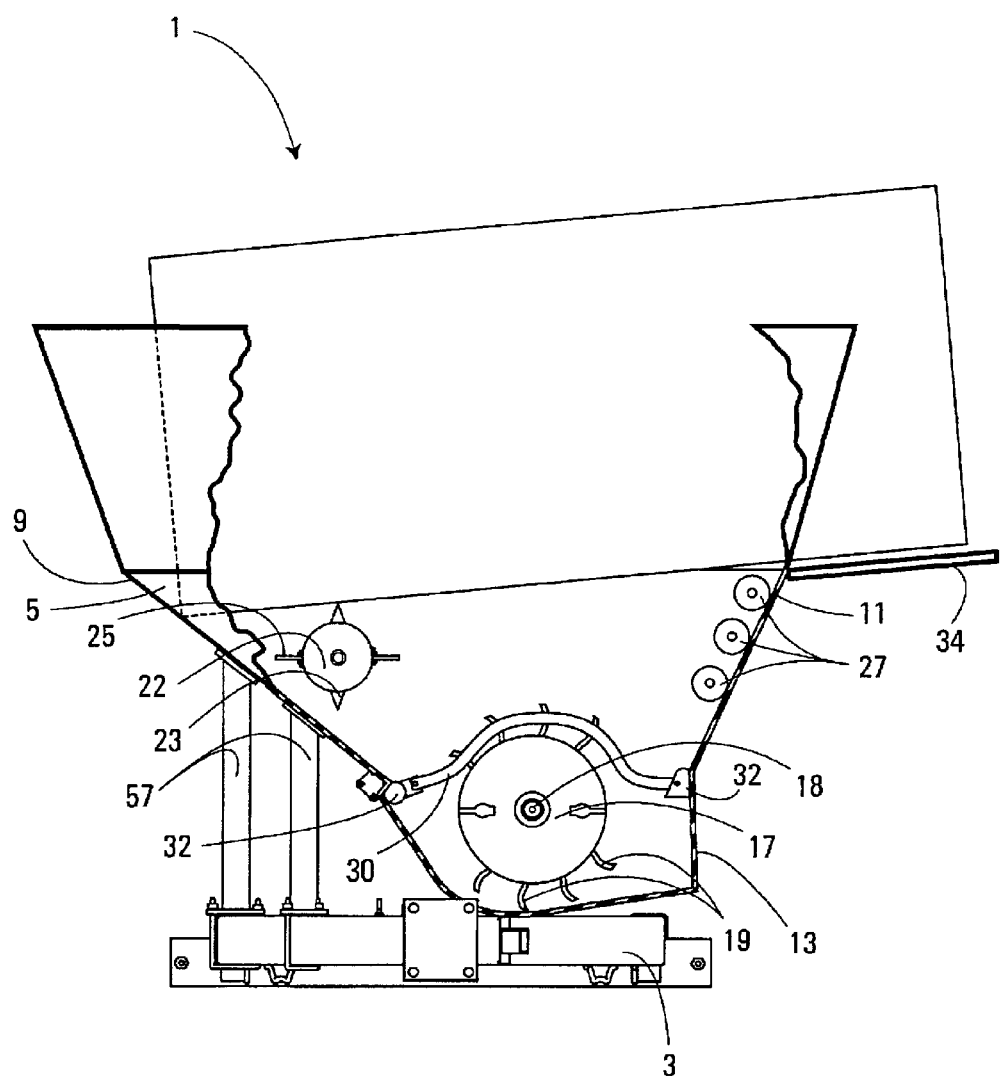
FIG. 5 is a cut away front view of a bale processor according to an embodiment of the invention with a large square bale positioned widthwise for loading therein.
Figure 6:
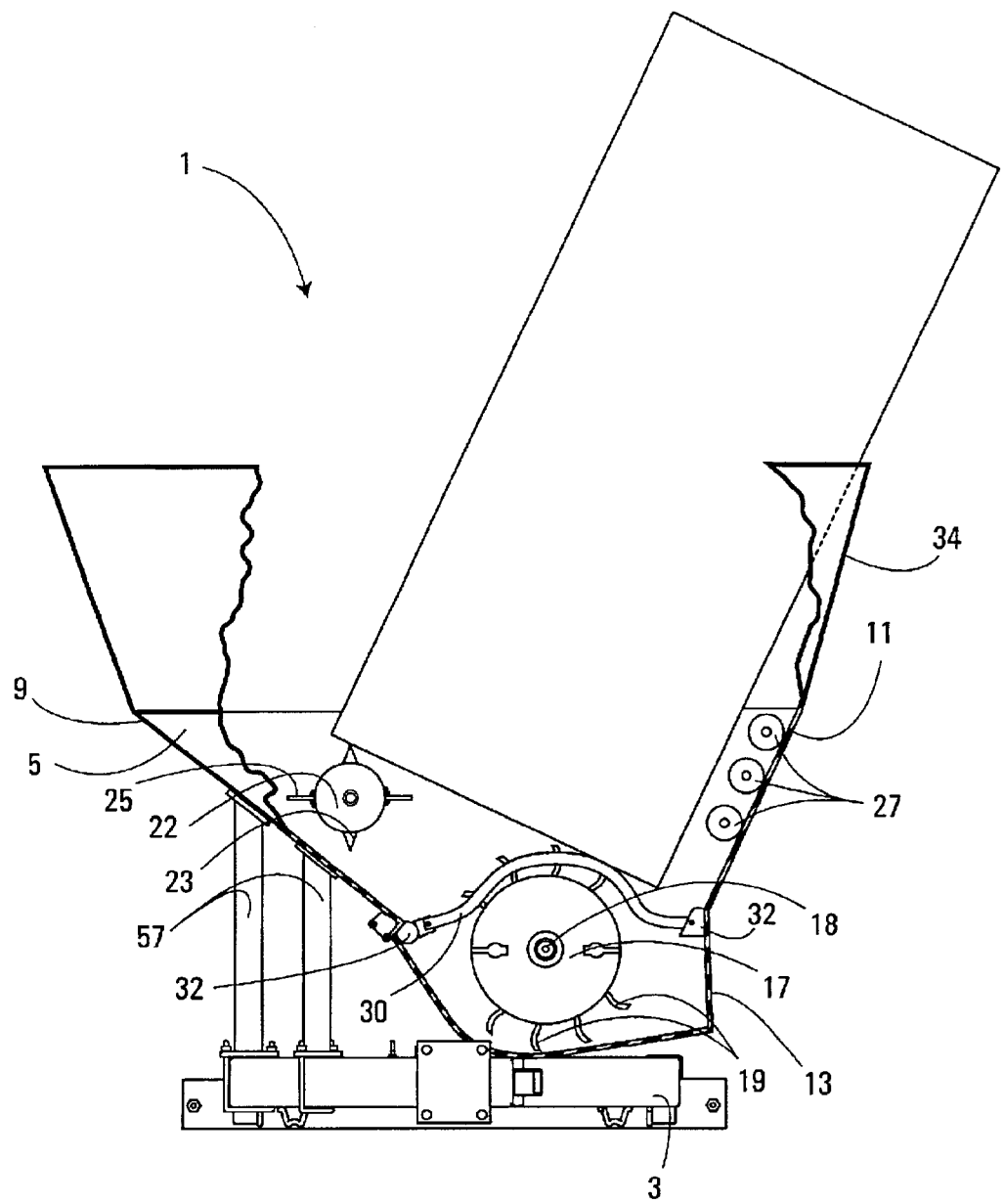
FIG. 6 is a cut away front view of a bale processor according to an embodiment of the invention with a large square bale positioned widthwise therein.

As shown in FIGS. 5 and 6, an upper portion 36 of side wall 11 is pivotally attached thereto to facilitate loading of large square bales widthwise within the processing tub. As shown in FIG. 5, the upper portion 36 of side wall 11 can be lowered to a generally horizontal position. The large square bale is then positioned within the processing tub and along the upper portion 36 of side wall 11. Once the large square bale is in position, the upper portion 36 of the side wall 11 is raised to its generally vertical position thereby positioning the bale within the processing tub 1 for disintegration as shown in FIG. 6. The upper portion 36 of side wall 11 can be raised or lowered either manually or actuated through a hydraulic or electric system of the type known in the art. Alternatively, the upper portion of side wall 9 could be pivotally mounted thereto to facilitate loading of large square bales in a similar manner.

Figure 8:
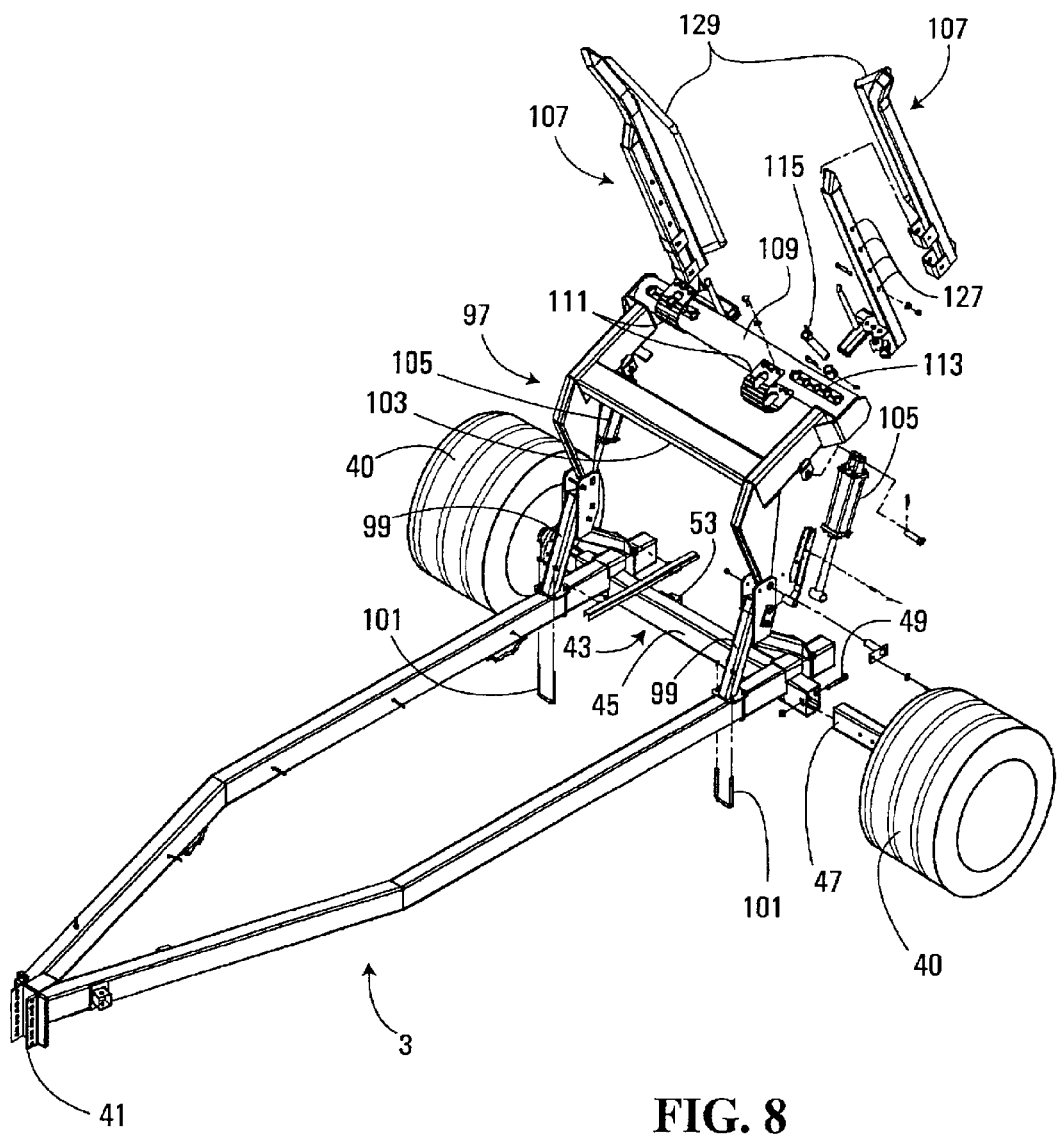
FIG. 8 is a partially exploded perspective view of a chassis of a bale processor with a fork lift mounted on the rear thereof according to an embodiment of the invention.

As shown in FIG. 8, the chassis 3 includes a hitch 41 mounted at the front thereof and an axle 43 positioned near the rear. Axle 43 has a hollow center portion 45 extending transversely across and secured to chassis 3 and end portions 47 adapted to be inserted therein on each side of the chassis 3. A ground-engaging wheel 40 is attached to each end portion 47. Each end portion 47 is adapted to slide axially within the center portion 45 to adjust the width of axle 43. End portions 47 are lockable at the desired location by insertion of a locking pin 49 through holes provided in the center portion 45 and in the end portions 47. Accordingly, the axle 43 can be widened to provide the apparatus with more stability over uneven terrain or narrowed to facilitate transport along a road or highway. Furthermore, the axle 43 can be widened to improve stability of the bale while large or more than one bale is loaded into the processing tub 1.

Figure 9:
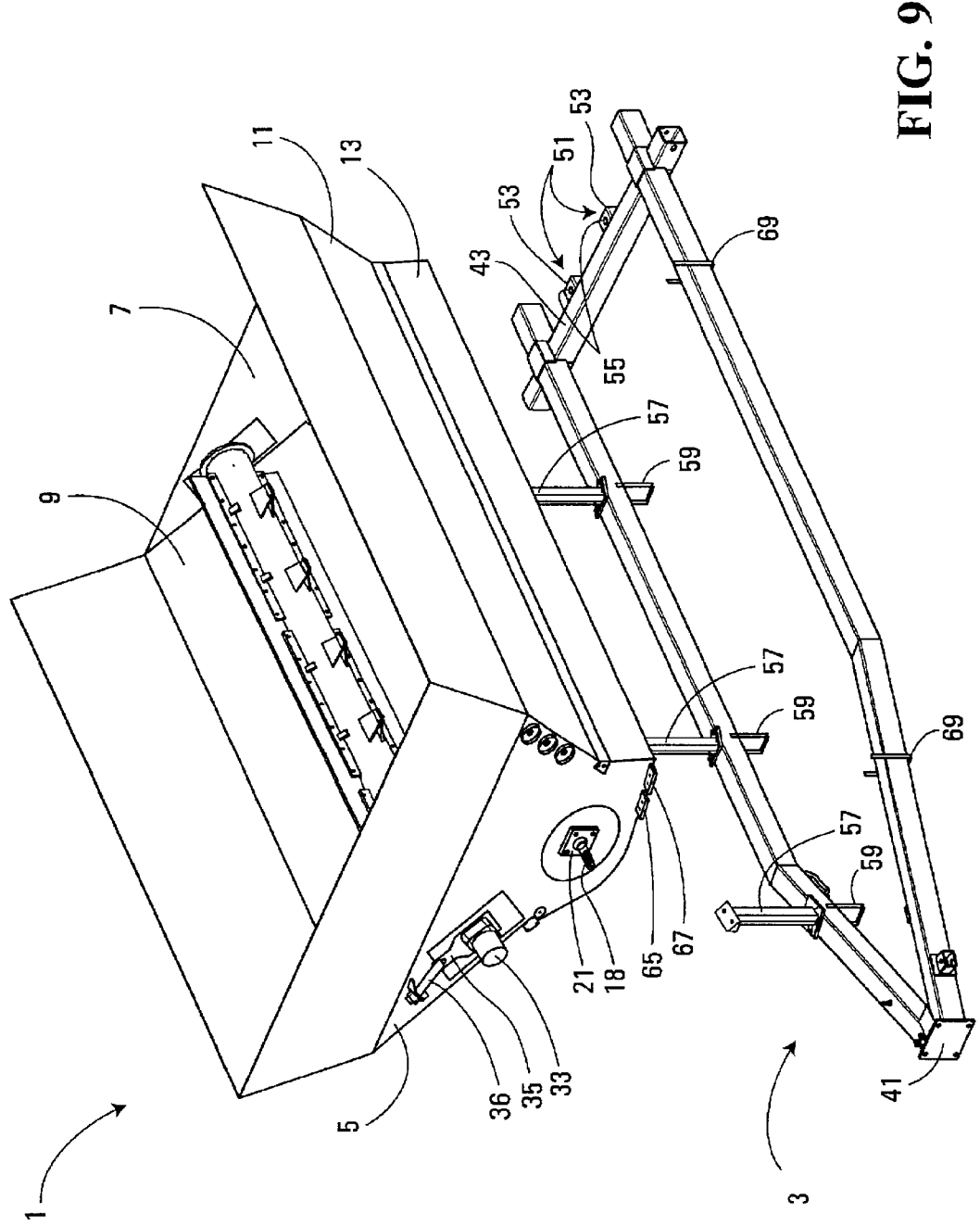
FIG. 9 is an exploded perspective view of a bale processor according to an embodiment of the invention in the left side discharge arrangement.

As shown in FIG. 9, axle 43 is also provided with jack mounts 51 to facilitate connection to a jack assembly (not shown). Each jack mount comprises a square bracket 53 with a hole 55 in the top bottom thereof. The square bracket 53 is sized to accept the male connection of the jack assembly. A locking pin (not shown) is inserted through the holes 55 to maintain the jack assembly connected during operation. The jack assembly is used to raise a side of the bale processor such that the width of the axle 43 can be adjusted as set out above.

Figure 18:
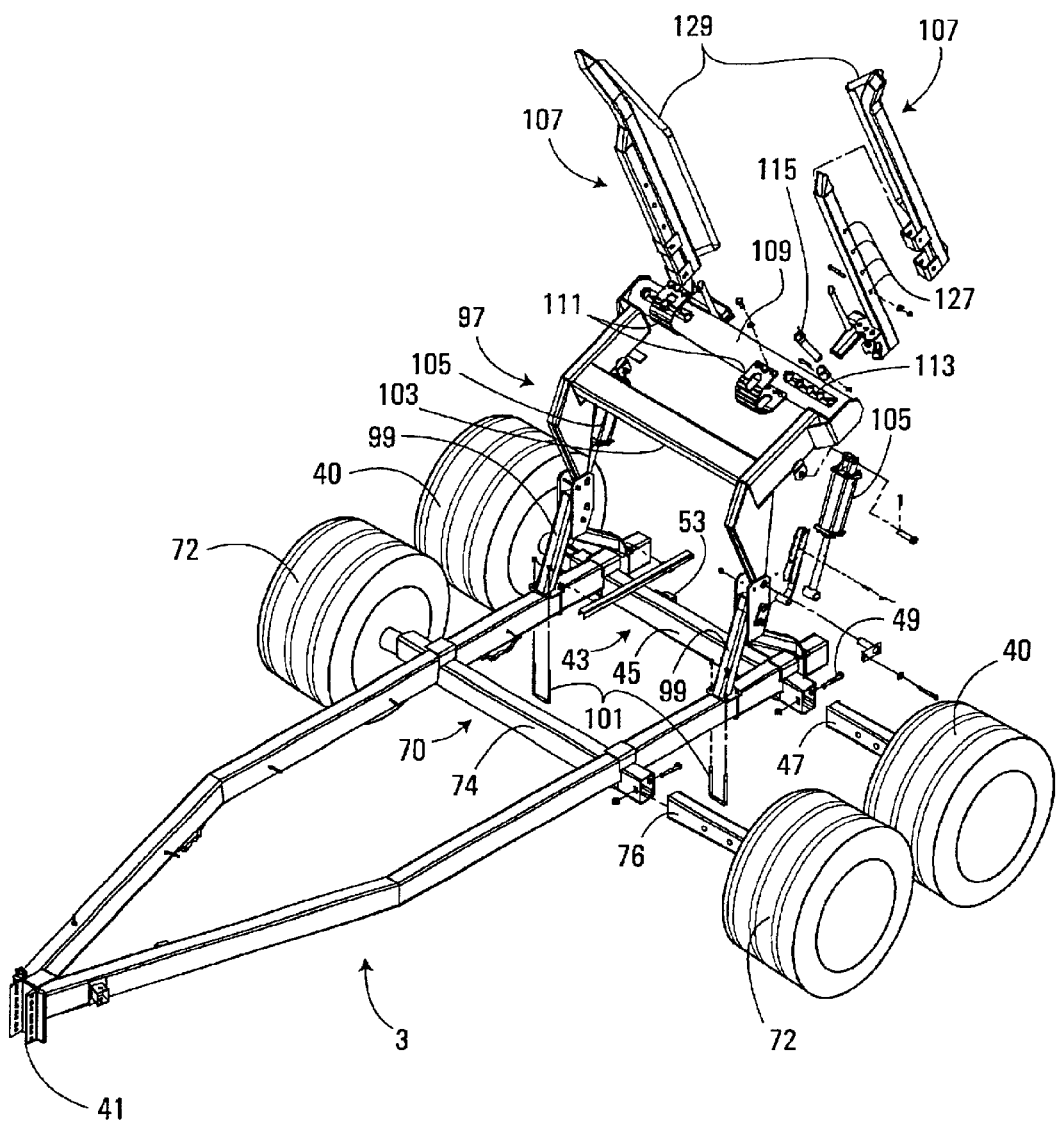
FIG. 18 is a partially exploded perspective view of a chassis of a bale processor with a fork lift mounted on the rear thereof according to an embodiment of the invention.

In a further embodiment shown in FIG. 18, the chassis 3 includes a second axle 70 positioned between the front of the chassis and axle 43. The second axle is provided with a ground engaging wheel 72 on each end thereof and includes a hollow center portion 74 and end portions 76 of the type shown for axle 43 such that the width of the axle is adjustable for stability and for ease of transport as described for axle 43. The second axle 70 is included to disperse the weight of the processing tub 1 and the baled material container therein from the axle 43 and hitch 41.

Figure 10:
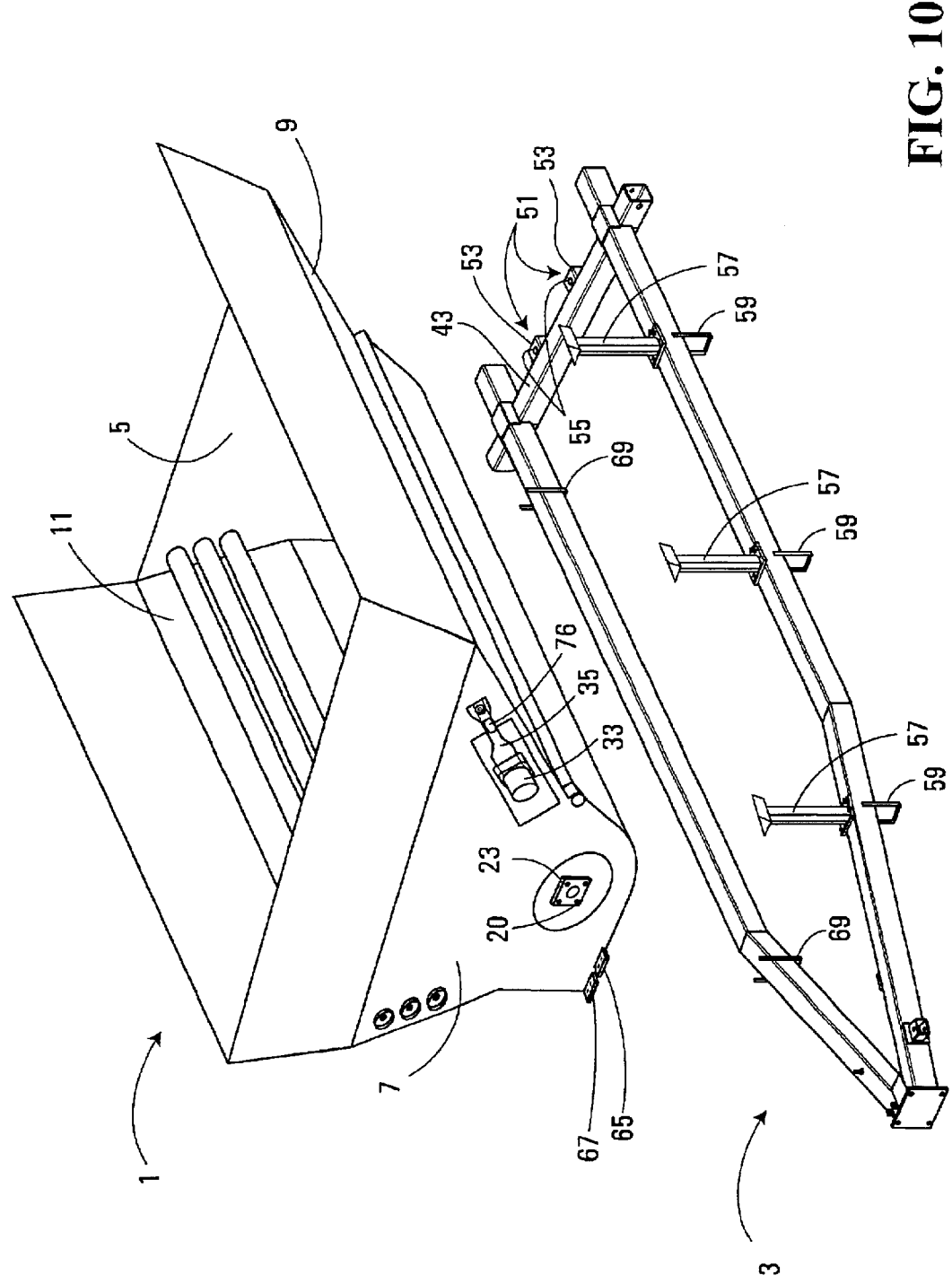
FIG. 10 is an exploded perspective view of a bale processor according to an embodiment of the invention in the right side discharge arrangement.

The processing tub 1 is detachably connected to the chassis 3 such that apparatus can be converted from a left side discharge arrangement as shown in FIGS. 1 and 9 to a right side discharge arrangement as shown in FIG. 10 or vice-a-versa. The processing tub 1 has front to back symmetry to facilitate the conversion.

As shown in FIG. 9, in the left side discharge arrangement, three support legs 57 are bolted to the right side of the chassis 3 by a U-shaped bolts 59. The processing tub 1 is connected to the upper part of support legs 57 by bolts. Each of end walls 5 and 7 of the processing tub 1 are provided with brackets 65 and 67 at the bottom thereof for connecting the processing tub 1 to the chassis 3 by U-shaped bolts 69. In the arrangement shown in FIG. 9, as a result of the configuration of the chassis 3, bracket 67 on end wall 7 and bracket 65 on end wall 5 are use to connect the processing tub 1 to the left side of chassis 3.

As shown in FIG. 10, the bale processor is converted to the right side discharge arrangement by disconnecting the processing tub 1 from the chassis 3 and the support legs 57. The support legs 57 are subsequently disconnected from the chassis 3 and moved to the left side of the chassis 3 and secured thereto by U-shaped bolts 59. The processing tub 1 is rotated by 180 degrees thereby positioning side wall 11 on the right side of the chassis. Side wall 9 is positioned on top of support legs 57 and secured thereto by bolts. The processing tub 1 is attached to the right side of chassis 3 by securing bracket 67 on end wall 5 and bracket 65 on end wall 7 to the right side of the chassis with U-shaped bolts 69.

Prior to conversion of the apparatus from the left side discharge arrangement shown in FIGS. 9 to the right side discharge arrangement shown in FIG. 10, the hydraulic motor 33 and hydraulic motor mount 35 must be disconnected and the flail drum 17 disconnected from the power source. Any other hydraulics or other systems would also be disconnected. Once the processing tub 1 is arranged in the right side discharge arrangement, as shown in FIG. 10, the hydraulic motor 33 and motor mount 35 are connected to end wall 7 of the processing tub 1 now located at the front of the chassis 3 in the same manner as discussed above. As bearings 31 are provided in each roller mount 29, the driven feed roller does not have to be removed to move the bearings from one end of the driven feed rollers to the other.

Figure 11:
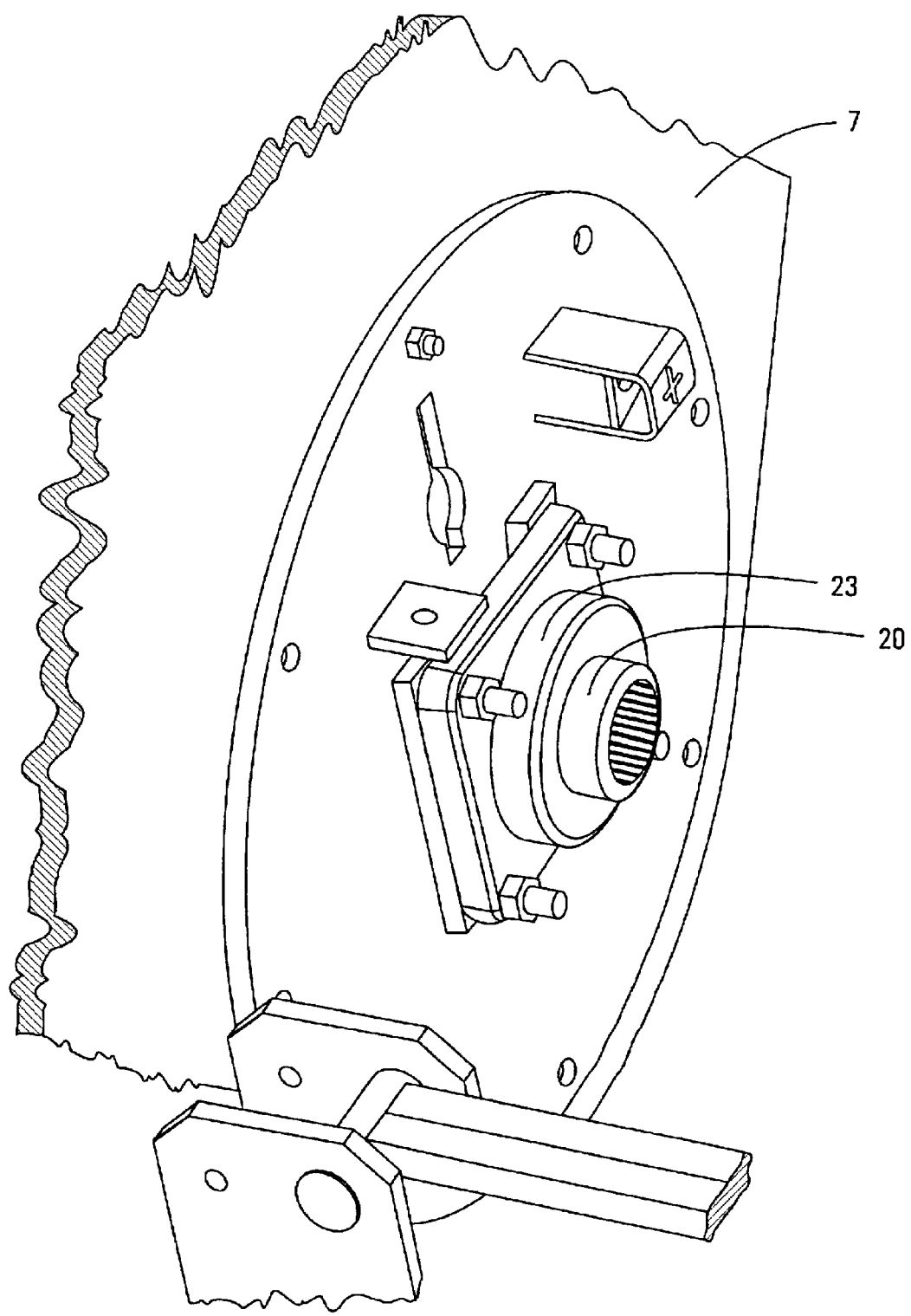
FIG. 11 is a perspective view of an end of the disintegrator adapted for connection to a rotation conversion device according to an embodiment of the invention.

Any other hydraulics or other systems are then re-connected to the bale processor once the processing tub 1 is secured to the chassis. In particular, the power source is connected to a flail roller axial rod 16 of the flail roller 17 extending through the set of bearings 21 provided in end wall 7 as shown in FIG. 11. However, in the embodiment shown, in the right side discharge arrangement, the flail roller 17 must be rotated in a counter-clockwise direction (when viewed from the rear) during operation. Accordingly, if the power source rotates in a clockwise direction (i.e. a PTO of a standard tractor) a rotation conversion device must be positioned between the power source and the flail roller 17.

Figure 12:
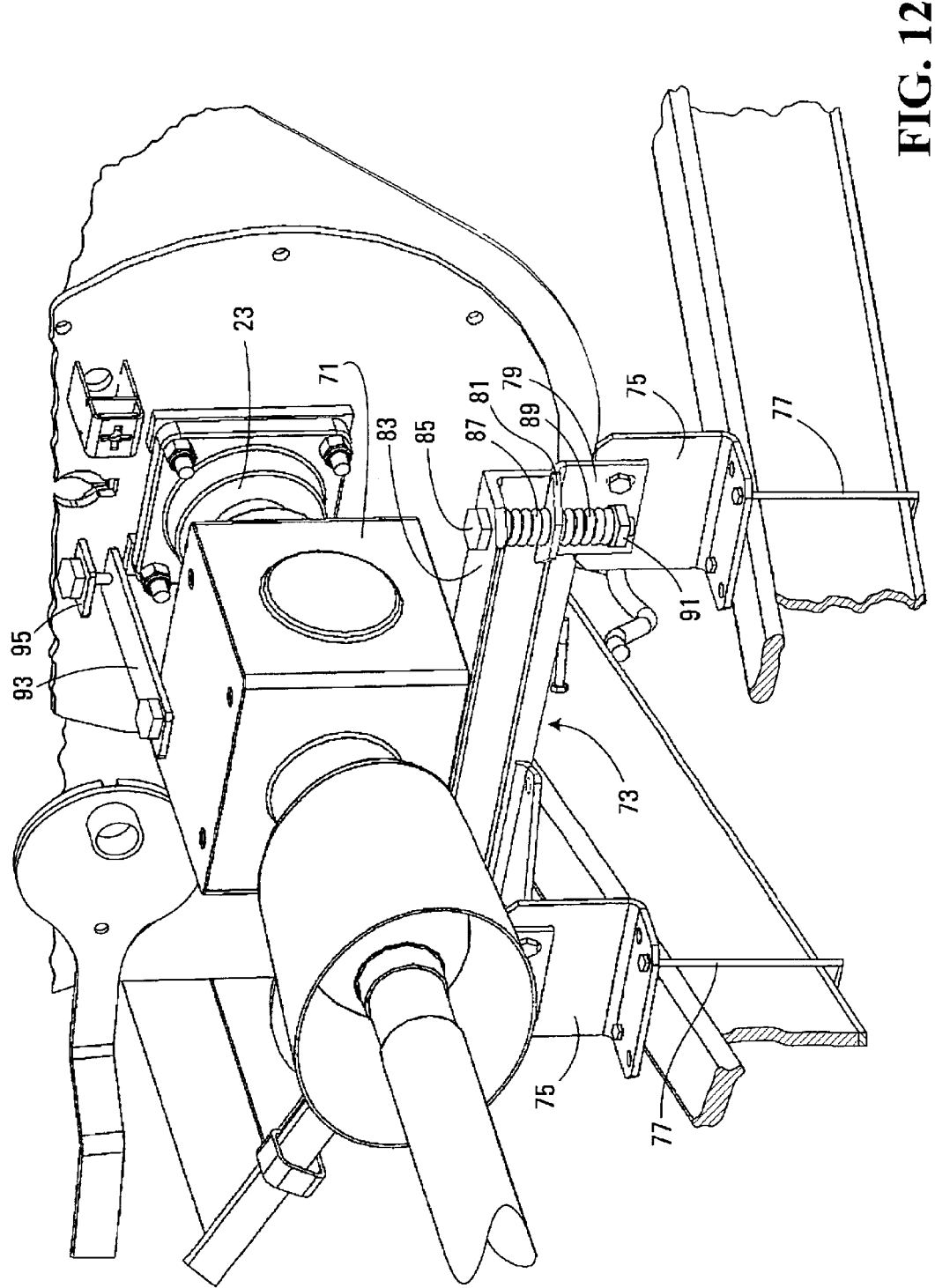
FIG. 12 is a perspective view of a rotation conversion device for a right side discharge arrangement of a bale processor according to an embodiment of the invention.

In the embodiment shown in FIG. 12, the rotation conversion device comprises a gearbox 71 of the type commonly used in the industry. The gearbox 71 is positioned on a dampener 73 to reduce the load on the bearings 21 and the power source due to the weight of the rotation conversion device. In addition, the dampener 73 also serves to absorb the vibrations and rotation of the gearbox 71 during acceleration or deceleration, especially during the start-up and shut down.

The dampener 73 is mounted to the chassis 3 by brackets 75 secured to the chassis by U-shaped bolts 77. An upper support 79 having a lip 81 is secured to each of the brackets 75. A cross support 83 is secured to bottom of gearbox 71 and extends between brackets 75. The cross support 83 is mounted at opposing ends thereof to each of the upper supports 79 by bolts 85 which extend through the cross support and through lips 81. Upper compression springs 87 are axially mounted on each of bolts 85 between the cross supports 83 and the lips 81 of upper supports 79. Lower compression springs 89 are axially positioned on each of bolts 85 below lips 81 and maintained in position by a nut 91.

The upper compression springs 87 are compressed to exert a slight upper pressure on the gearbox 71 to remove the stress from the weight of the gearbox from the bearings 21 and the power source. Furthermore, during operation, as the gearbox 71 rotates, opposing upper and lower compressions springs 87 and 89 co-operate to return the cross support 83, and thus the gearbox 71, to a level position.

Gearboxes known in the art are typically provided with a male splined connectors for connecting to input and output shafts. Accordingly, as shown in FIG. 11, the flail roller axial rod 16 is provided with a female splined connector adapted to receive the male splined connector of gearbox 71. As shown in FIG. 12, a connection arm 93 is attached to the top of the gearbox 71 at one end thereof and secured to a bracket 95 mounted on the processing tub 1 at the other end. The connection arm prevents the gearbox 71 from pulling away from the processing tub 1 and disconnecting from the flail roller axial rod 16.

It will be understood by those skilled in the art that alternative rotation conversion devices, such as a belt or chain arrangement, may be used without departing from the invention in its broadest aspect.

Figure 13:
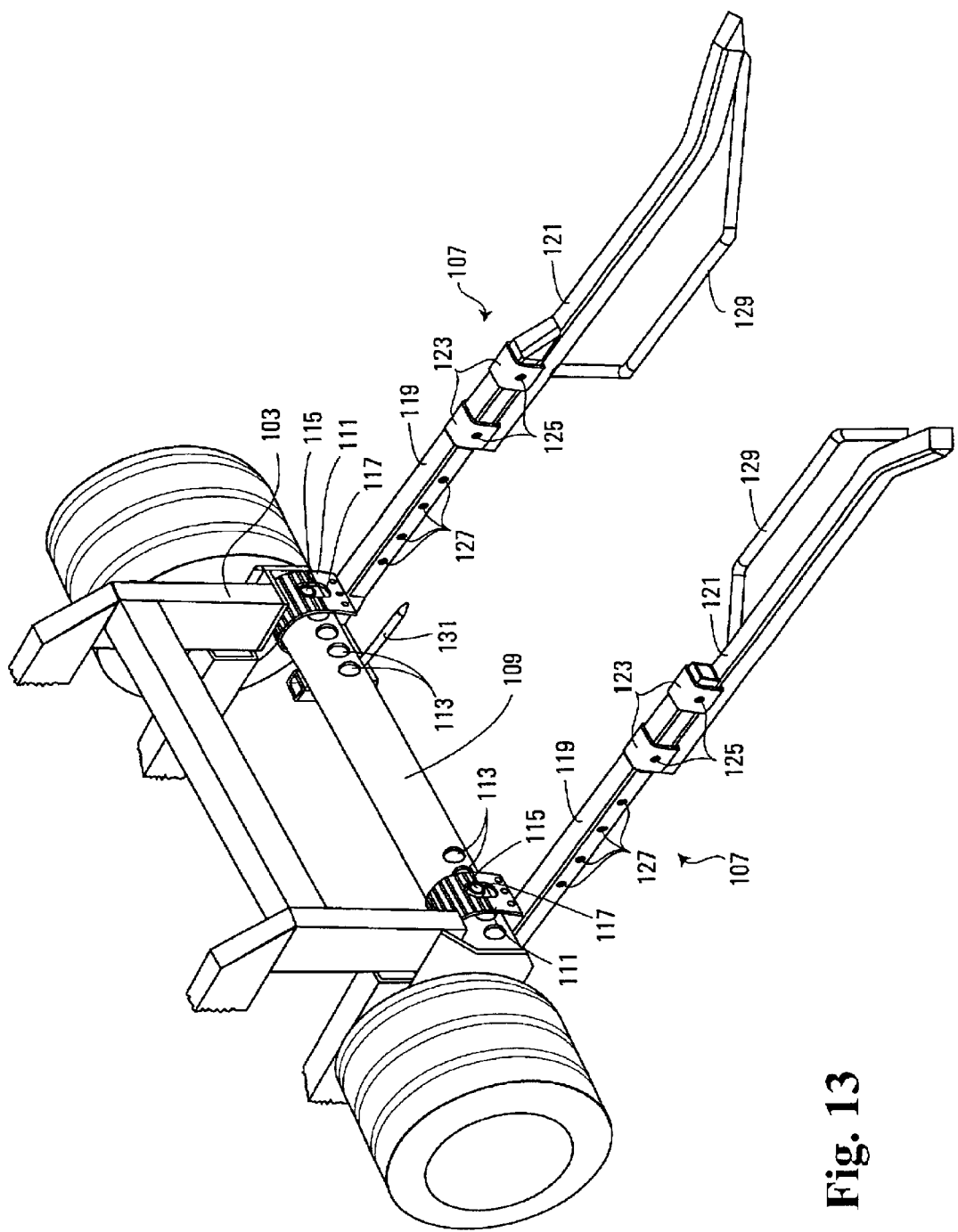
FIG. 13 is a perspective view of a fork lift of a bale processor according to an embodiment of the invention.

As shown in FIGS. 8 and 13, an adjustable fork lift 97 is mounted on the rear of chassis 3 for raising baled material into the processing tub 1. The adjustability of the fork lift 97 permits bales of different configurations to be lifted into the processing tub 1. The fork lift 97 is mounted to each side of the chassis 3 by a mounting bracket 99 secured to the chassis by U-shaped bolts 101. A fork lift frame 103 is pivotally attached to each of the mounting brackets 99. Hydraulic cylinders 105 are pivotally mounted between the fork lift frame 103 and mounting brackets 99 to raise and lower the fork lift frame.

Two forks 107 are mounted to a bottom cross bar 109 of the fork lift frame 103 by curved brackets 111. The curved brackets 111 are adapted to slide axially along the cross bar 109 to adjust the separation between the two forks 107. Each side of the cross bar 109 is provided with a series of adjustment holes 113 to receive a locking pin 115 which is inserted through a hole 117 provided in the front of curved brackets 111 to lock the forks 107 at the desired location.

As best shown in FIG. 13, the length of each fork 107 is also adjustable. Each fork 107 includes a rear section 119 and a front section 121 mounted on the rear section by square brackets 123. The square brackets 123 slide axially along the rear section 119 to adjust the length of the fork 107. Each square brackets 123 is provided with holes 125 on opposing sides thereof and the rear section 119 is provided with a series of adjustment holes 127. The fork 107 can be locked at a desired length by insertion of a locking pin or bolt through the holes 125 in the square brackets 123 and one of the adjustment holes 127 in the rear section 119.

The front section 121 of each fork 107 has a bale carrier 129 extending inwardly towards the opposing fork. The bale carriers 129 are the main contact surface for the baled material and prevent the baled material from passing between the forks 107 as it is loaded into the processing tub 1. A bale spear 131 is also mounted on the cross bar 109 between the two forks 107. As the baled material is positioned on forks 107 and slides toward cross bar 109, the bale spear 131 punctures the baled material to maintain the baled material in position as it is raised into the processing tub 1.

Figure 16:
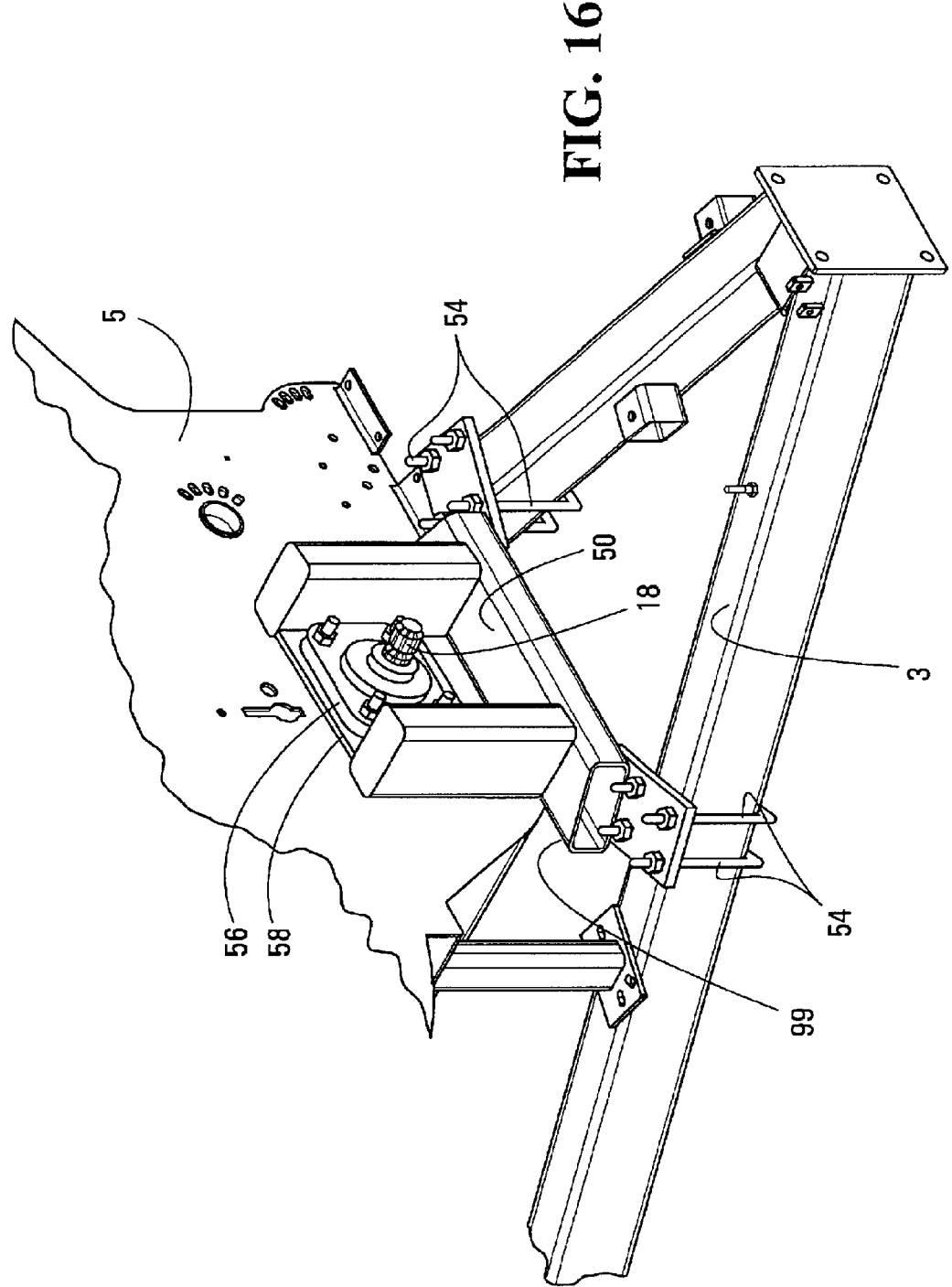
FIG. 16 is a perspective view of a front flail roller mount according to an embodiment of the invention.
Figure 17:
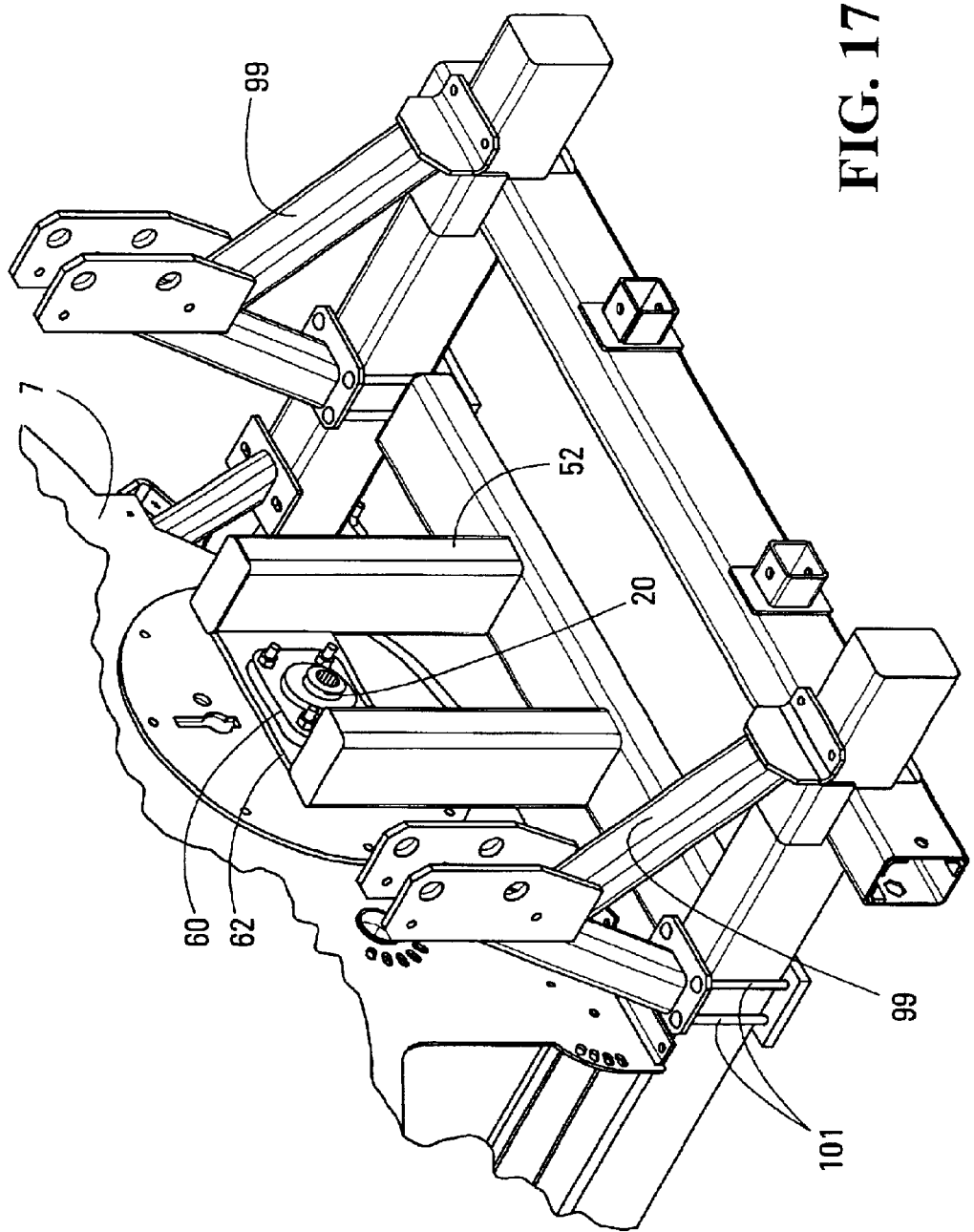
FIG. 17 is a perspective of a rear flail roller mount according to an embodiment of the invention.

FIGS. 16 and 17 illustrate an alternative embodiment for mounting flail roller 17 within the processing tub 1. The illustrated embodiment is shown with the processing tub 1 mounted on chassis 3 in the left side discharge arrangement. As shown in FIG. 16, a front mounting bracket 50 is secured to the front end of chassis 3 by U-shaped bolts 54 adjacent to end wall 5. The front mounting bracket 50 has a cross-member 58 with a set of bearings 56 mounted thereon. The front mounting bracket 50 is designed such that the cross-member 58 is position in front of a hole provided in end wall 5 of the processing tub. The flail roller axial rod 18 extends through the hole in end wall 5 and through bearings 56, thereby supporting the front end of flail roller 17. The flail roller axial rod 18 is sized such that a portion thereof extends from the bearings 56 for connection to the power source.

As shown in FIG. 17, a rear mounting bracket 52 is secured to the rear end of chassis 3 adjacent to end wall 7 by U-shaped bolts 101 which also secures the fork lift mounting brackets 99 to chassis 3. The rear mounting bracket 52 has a cross-member 62 with a set of bearings 60 mounted thereon. The rear mounting bracket 50 is designed such that the cross-member 62 is positioned behind a hole provided in end wall 7 of the processing tub. The flail roller axial rod 16 extends through the hole in end wall 7 and through bearings 60, thereby supporting the rear end of flail roller 17.

For conversion from the left side discharge arrangement to the right side discharge arrangement, the front and rear mounting brackets 50 and 52 are disconnected from the chassis 3. The processing tub 1 is then disconnected from the chassis 3 and rotated 180 degrees as discussed above. Once the processing tub 1 is reconnected to chassis 3 the front and rear mounting brackets 50 and 52 are reconnected to the chassis such that the flail roller axial rod 18 is positioned in bearings 56 and the flail roller axial rod 16 is positioned in bearings 60.

Mounting the flail roller 17 in the manner shown in FIGS. 16 and 17 alleviates the stress caused on the bearings 21 due to vibrations in end walls 5 and 7.

It will be understood by those skilled in the art that numerous alterations, modifications and variations to the above embodiments can be made without departing from the invention as claimed.

What is claimed is:

1. An apparatus for processing baled crop material comprising:

a chassis;

a bale receptacle mounted on the chassis, said receptacle having a front wall and a rear wall a first side wall on a first side and a second side wall on a second side connected together to form an open top into which a bale can be fed;

the first side wall and the second side wall each being generally inclined inwardly and downwardly from the open top toward a bottom of the receptacle;

the first and second side walls being mounted so as to remain in fixed position during loading and feeding of a bale such that the bale is loaded from above through the open top;

a bottom discharge section of the receptacle being provided at the bottom of the side walls and including a discharge opening on the first side of the receptacle underneath the first side wall and opposite to said second side wall;

a flail roller mounted in the bottom discharge section of the bale receptacle for rotation about an axis of the roller which axis extends along the receptacle from the front wall to the rear wall;

the flail roller having a plurality of flails arranged to rotate with the roller around the axis to carry the baled material of the bale and to discharge the processed baled material out of the bale receptacle through the discharge opening;

the flail roller being arranged to rotate in a direction so as to carry the baled material from the second side wall underneath the roller to the discharge opening underneath the first side wall;

a plurality of parallel grate bars at spaced positions along the flail roller between which the flails extend, the grate bars each extending from a position on the first side wall above the discharge opening to the second side wall;

a driven roller mounted in the bale receptacle for driven rotation about its axis with its axis parallel to the axis of the flail roller, the driven roller being spaced inwardly of the inclined second side wall, said driven roller being adapted to engage and provide support for a bale in the bale receptacle inwardly of the second wall and above said flail roller;

the driven roller having outwardly extending bale engaging members thereon to engage the bale and to provide rotational force to the bale in the bale receptacle to rotate the bale and to expose different parts thereof to the flail roller when the bale is being processed;

the second side wall and the driven roller being arranged such that the bale is supported against downward movement on the second side of the grate bars substantially wholly by the driven roller;

the first side wall being arranged such that the bale is supported against downward movement on the first side of the grate bars substantially wholly by the first side wall.

2. An apparatus as claimed in claim 1 wherein one of the side walls includes an upper portion pivotally moveable about a horizontal axis longitudinal of said one of the side walls.

3. An apparatus as claimed in claim 1 wherein the driven roller is mounted at opposing ends thereof to the end walls of the bale receptacle by adjustable roller mounts adapted to adjust the position of the driven roller relative to the flail roller.

4. An apparatus as claimed in claim 1 wherein the driven roller is mounted adjacent to one of the side walls of the bale receptacle and the adjustable roller mounts are adapted to maintain the driven feed roller parallel to said side wall.

5. An apparatus as claimed in claim 1 wherein the bale receptacle is detachably connected to the chassis thereby permitting rotation thereof such that the discharge opening can be positioned on either the left or right side of the chassis.

6. An apparatus as claimed in claim 1 wherein the flail roller has opposing ends extending through the end walls and each end of the flail roller includes a connection assembly for detachably connecting the flail roller to a power source; and wherein the connection assembly of one of the ends of the flail roller includes a rotation converter having an input shaft connected to the power source and an output shaft connected to the flail roller wherein the rotation converter translates rotation of the input shaft into rotation of the output shaft in the opposite direction.

7. An apparatus as claimed in claim 1 wherein the flails are each mounted on a respective one of a plurality of pivot mounts on the flail roller and have a length such that the ratio of the length of the flails to the distance between pivotal mounts of flails on opposing sides of the flail roller is less than 0.5 and the distance between the pivotal mounts on opposing sides of the flail roller is greater than 15⅜ inches.

8. An apparatus for processing baled crop material comprising:

a chassis;

a bale receptacle mounted on the chassis, said receptacle having a front wall and a rear wall a first side wall on a first side and a second side wall on a second side connected together to form an open top into which a bale can be fed;

the first side wall and the second side wall each being generally inclined inwardly and downwardly from the open top toward a bottom of the receptacle;

the first and second side walls being mounted so as to remain in fixed position during loading and feeding of a bale such that the bale is loaded from above through the open top;

a bottom discharge section of the receptacle being provided at the bottom of the side walls and including a discharge opening on the first side of the receptacle underneath the first side wall and opposite to said second side wall;

a flail roller mounted in the bottom discharge section of the bale receptacle for rotation about an axis of the roller which axis extends along the receptacle from the front wall to the rear wall;

the flail roller having a plurality of flails arranged to rotate with the roller around the axis to carry the baled material of the bale and to discharge the processed baled material out of the bale receptacle through the discharge opening;

the flail roller being arranged to rotate in a direction so as to carry the baled material from the second side wall underneath the roller to the discharge opening underneath the first side wall;

a plurality of parallel grate bars at spaced positions along the flail roller between which the flails extend, the grate bars each extending from a position on the first side wall above the discharge opening to the second side wall;

a driven roller mounted in the bale receptacle for driven rotation about its axis with its axis parallel to the axis of the flail roller, the driven roller being spaced inwardly of the inclined second side wall, said driven roller being adapted to engage and provide support for a bale in the bale receptacle inwardly of the second wall and above said flail roller;

the driven roller having outwardly extending bale engaging members thereon to engage the bale and to provide rotational force to the bale in the bale receptacle to rotate the bale and to expose different parts thereof to the flail roller when the bale is being processed;

the second side wall and the driven roller being arranged such that the bale is supported against downward movement on the second side of the grate bars at least primarily by the driven roller;

at least one freely rotatable, non-driven rotatable member in the bale receptacle inwardly of the inclined first side wall with an axis of rotation parallel to the axis of the flail roller, said non-driven rotatable member being adapted to engage and provide support for a bale in the bale receptacle above said flail roller;

the first side wall being arranged such that the bale is supported against downward movement on the first side of the grate bars at least partly by the at least one non-driven rotatable member.

9. An apparatus as claimed in claim 8 wherein one of the side walls includes an upper portion pivotally moveable about a horizontal axis longitudinal of said one of the side walls.

10. An apparatus as claimed in claim 8 wherein the driven roller is mounted at opposing ends thereof to the end walls of the bale receptacle by adjustable roller mounts adapted to adjust the position of the driven roller relative to the flail roller.

11. An apparatus as claimed in claim 8 wherein the driven roller is mounted adjacent to one of the side walls of the bale receptacle and the adjustable roller mounts are adapted to maintain the driven feed roller parallel to said side wall.

12. An apparatus as claimed in claim 8 wherein the bale receptacle is detachably connected to the chassis thereby permitting rotation thereof such that the discharge opening can be positioned on either the left or right side of the chassis.

13. An apparatus as claimed in claim 8 wherein the flail roller has opposing ends extending through the end walls and each end of the flail roller includes a connection assembly for detachably connecting the flail roller to a power source; and wherein the connection assembly of one of the ends of the flail roller includes a rotation converter having an input shaft connected to the power source and an output shaft connected to the flail roller wherein the rotation converter translates rotation of the input shaft into rotation of the output shaft in the opposite direction.

14. An apparatus as claimed in claim 8 wherein the flails are each mounted on a respective one of a plurality of pivot mounts on the flail roller and have a length such that the ratio of the length of the flails to the distance between pivotal mounts of flails on opposing sides of the flail roller is less than 0.5 and the distance between the pivotal mounts on opposing sides of the flail roller is greater than 15⅜ inches.

* * * * *